US012693463B2

(12) United States Patent
Cho et al.

(10) Patent No.: US 12,693,463 B2
(45) Date of Patent: Jul. 28, 2026

(54) OPTICAL APPARATUS INCLUDING MULTILAYERED OPTICAL FILM STRUCTURE AND METHOD AND APPARATUS FOR PLANARIZING THE MULTILAYERED OPTICAL FILM STRUCTURE

(71) Applicant: SAMSUNG ELECTRONICS CO., LTD., Suwon-si (KR)

(72) Inventors: Eunhyoung Cho, Suwon-si (KR); Hyochul Kim, Yongin-si (KR); Sunghee Lee, Suwon-si (KR); Jeongyub Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 837 days.

(21) Appl. No.: 17/891,332

(22) Filed: Aug. 19, 2022

(65) Prior Publication Data

US 2023/0244017 A1 Aug. 3, 2023

(30) Foreign Application Priority Data

Feb. 3, 2022 (KR) ........................ 10-2022-0014389

(51) Int. Cl.
*G02B 5/28* (2006.01)
(52) U.S. Cl.
CPC .................................... *G02B 5/285* (2013.01)
(58) Field of Classification Search
CPC ........ G01B 11/06; H04N 9/045; G02B 5/201; G02B 1/002; G02B 5/285
See application file for complete search history.

(56) References Cited

U.S. PATENT DOCUMENTS 5,910,846 A * 6/1999 Sandhu ................. B24B 37/013
451/6
6,280,289 B1 8/2001 Wiswesser et al.
(Continued)

FOREIGN PATENT DOCUMENTS

JP 2004-281544 A 10/2004
JP 5772236 B2 9/2015
(Continued)

OTHER PUBLICATIONS

Nam-Woo Kim et al, "A Study of Data correction method when in-situ end point detection in Chemical-Mechanical Polishing of Copper Overlay", J. Korea Inst. Inf. Commun. Eng., vol. 18, No. 6, pp. 1401-1406, Jun. 2014.
(Continued)

*Primary Examiner* — Audrey Y Chang
(74) *Attorney, Agent, or Firm* — Sughrue Mion, PLLC

(57) ABSTRACT

An optical apparatus includes a lower optical layer; a nanostructure layer disposed on the lower optical layer and having an active region and a non-active region; and a reflective pad disposed between the lower optical layer and the nanostructure layer to face the non-active region of the nanostructure layer, wherein the nanostructure layer includes a first dielectric patterned in the active region and unpatterned in the non-active region and a second dielectric filled between patterns of the first dielectric, and the first dielectric includes a first material and the second dielectric includes a second material different from the first material and having a different refractive index from a refractive index of the first material.

18 Claims, 23 Drawing Sheets

(56) References Cited

U.S. PATENT DOCUMENTS

| | | | |
|---|---|---|---|
| 2016/0156883 A1* | 6/2016 | Han | H10F 39/806 |
| | | | 348/360 |
| 2018/0143359 A1* | 5/2018 | Channon | G02B 1/14 |
| 2019/0086579 A1* | 3/2019 | Kim | G02B 27/4211 |
| 2019/0240802 A1 | 8/2019 | Hariharan et al. | |
| 2020/0391341 A1 | 12/2020 | Togawa et al. | |
| 2022/0404525 A1* | 12/2022 | Wolk | G02B 5/1809 |
| 2025/0120205 A1* | 4/2025 | Noudo | H10F 39/014 |

FOREIGN PATENT DOCUMENTS

| | | |
|---|---|---|
| KR | 10-2016-0064922 A | 6/2016 |
| KR | 10-2019-0033283 A | 3/2019 |
| KR | 10-2020-0108098 A | 9/2020 |
| WO | 2021/111300 A1 | 6/2021 |

OTHER PUBLICATIONS

H. Hocheng et al, "A comprehensive review of end point detection in chemical mechanical polishing for deep-submicron integrated circuits manufacturing", International Journal of Materials and Product Technology, vol. 18, Jan. 1, 2003, (18 pages).

S.Bourzgui et al, "Device pattern impact on optical endpoint detection by interferometry for STI CMP", ICPT 2017; International Conference on Planarization/CMP Technology, Leuven, Belgium, 2017, pp. 1-6.

Jingang Yi et al, "Broadband optical end-point detection for linear chemical-mechanical planarization (CMP) processes using an image matching technique", Mechatronics, vol. 15, Issue 3, Apr. 2005, pp. 271-290.

Office Action dated Oct. 20, 2025, issued by Korean Patent Office in Korean Patent Application No. 10-2022-0014389.

* cited by examiner

OPTICAL APPARATUS INCLUDING MULTILAYERED OPTICAL FILM STRUCTURE AND METHOD AND APPARATUS FOR PLANARIZING THE MULTILAYERED OPTICAL FILM STRUCTURE

CROSS-REFERENCE TO RELATED APPLICATION

This application is based on and claims priority under 35 U.S.C. § 119 to Korean Patent Application No. 10-2022-0014389, filed on Feb. 3, 2022, in the Korean Intellectual Property Office, the disclosure of which is incorporated by reference herein in its entirety.

BACKGROUND

1. Field

The disclosure relates to optical apparatuses including a multilayered optical film structure and methods and apparatuses for planarizing the multilayered optical film structure including a plurality of optical films.

2. Description of Related Art

Recently, a meta structure having properties that are not present in nature, which are obtained by arranging nanoscale structures smaller than a wavelength of light, has been developed. For example, research into manufacturing a lens having a spot size less than or equal to a diffraction limit or manufacturing a spectral filter, color filter, prism, polarizing filter, etc. of low light loss or chromatic aberration by using the meta structure is in progress. In addition, a meta structure may be applied to various optical apparatuses such as an image sensor, a spectrometer, a microscope, etc.

When an optical apparatus including the meta structure is manufactured, a process of filling space between the nanoscale structures with a gap filling material and planarizing the gap filling material may be performed. However, various optical apparatuses including a meta structure include a plurality of optical thin films in addition to the meta structure, and the plurality of optical thin films causes difficulties in a precise endpoint detection of the planarization process.

SUMMARY

Provided is an optical apparatus including a multilayered optical thin film structure.

Provided are a method and apparatus for precisely planarizing a multilayered optical thin film structure including a plurality of optical thin films.

Additional aspects will be set forth in part in the description which follows and, in part, will be apparent from the description, or may be learned by practice of embodiments of the disclosure.

In accordance with an aspect of the disclosure, an optical apparatus includes a lower optical layer; a nanostructure layer disposed on the lower optical layer, the nanostructure layer including an active region and a non-active region; and a reflective pad disposed between the lower optical layer and the nanostructure layer to face the non-active region of the nanostructure layer, wherein the nanostructure layer includes a first dielectric patterned in the active region and unpatterned in the non-active region and a second dielectric filled between patterns of the first dielectric, and wherein the first dielectric includes a first material and the second dielectric includes a second material different from the first material and having a different refractive index from a refractive index of the first material.

A height of an upper surface of the first dielectric in the non-active region may be higher than a height of the upper surface of the first dielectric in the active region.

The second dielectric may be disposed to cover the upper surface of the first dielectric, and an upper surface of the second dielectric has a planar surface.

A thickness of the second dielectric on the upper surface of the first dielectric in the active region may be greater by a thickness of the reflective pad than a thickness of the second dielectric on the upper surface of the first dielectric in the non-active region.

A thickness of the reflective pad may be about 10 nm to about 50 nm.

The reflective pad may be circular or polygonal having an area of about 5 $\mu m^2$ to about 25 $\mu m^2$.

The second dielectric may be disposed only between adjacent patterns of a plurality of patterns of the first dielectric in the active region, the first dielectric and the second dielectric may include a planar common upper surface, and a thickness of the first dielectric in the active region may be greater than a thickness of the first dielectric on the reflective pad.

The optical apparatus may further include an etch stop layer disposed between the lower optical layer and the nanostructure layer, the etch stop layer being disposed to cover the reflective pad.

A height of an upper surface of the etch stop layer in the non-active region may be greater than a height of an upper surface of the etch stop layer in the active region by a thickness of the reflective pad.

The optical apparatus may further include an etch stop layer disposed between the lower optical layer and the nanostructure layer, wherein the reflective pad is disposed on the etch stop layer.

A width or a diameter of each pattern of a plurality of patterns of the first dielectric may be about 10 nm to about 400 nm, and a thickness of each pattern of the plurality of patterns of the first dielectric may be about 100 nm to about 1,500 nm.

The lower optical layer may include a sensor substrate including a plurality of light sensing cells arranged to face the active region and a driving circuit region arranged to face the non-active region, the nanostructure layer may include a meta lens layer including a plurality of lens elements disposed to face the plurality of light sensing cells in the active region, and the first dielectric in each of the plurality of lens elements may be patterned to form a planar optical meta lens.

The lower optical layer may include a sensor substrate including a plurality of light sensing cells arranged to face the active region and a driving circuit region arranged to face the non-active region, the nanostructure layer may include a meta color filter layer including a plurality of color filters disposed to face the plurality of light sensing cells in the active region, and a plurality of the first dielectrics and a plurality of the second dielectrics may be alternately arranged in a horizontal direction in the plurality of color filters.

The optical apparatus may further include a first reflector disposed between the lower optical layer and the nanostructure layer and a second reflector disposed on the nanostructure layer, wherein the reflective pad is disposed in the non-active region on the first reflector The nanostructure layer may include a first nanostructure layer and a second nanostructure layer stacked in a thickness direction of the optical apparatus.

The optical apparatus may further include a first metal reflective layer disposed between the first nanostructure layer and the second nanostructure layer, and a second metal reflective layer disposed on the second nanostructure layer.

The lower optical layer may include a sensor substrate including a plurality of light sensing cells arranged to face the active region and a driving circuit region arranged to face the non-active region, and the first nanostructure layer, the first metal reflective layer, the second nanostructure layer, and the second metal reflective layer may be configured to form a spectral filter layer comprising a plurality of spectral filters arranged in the active region.

In accordance with an aspect of the disclosure, a method of manufacturing an optical apparatus includes forming a lower optical layer; forming a reflective pad in an edge region of an upper surface of the lower optical layer; forming an etch stop layer to a constant thickness to cover both the lower optical layer and the reflective pad; forming a first dielectric on the etch stop layer to a constant thickness; patterning a portion of the first dielectric disposed within an active region of the optical apparatus; forming a second dielectric to be filled in a space between patterns of the patterned first dielectric and to cover the first dielectric; and planarizing an upper surface of the second dielectric; wherein the planarizing includes irradiating illumination light to the reflective pad and detecting reflected light from the reflective pad; and determining a polishing speed, a thickness of the second dielectric, and an end time of the planarizing by comparing a simulated reflectance spectrum of reflected light according to the thickness of the second dielectric obtained previously through simulation with an actually measured reflectance spectrum obtained by the detecting of the reflected light.

The reflective pad may be disposed to face a non-active region of the optical apparatus where the first dielectric is not patterned.

A thickness of the second dielectric on an upper surface of the first dielectric in the active region may be greater by a thickness of the reflective pad than a thickness of the second dielectric on the upper surface of the first dielectric in a non-active region of the optical apparatus.

A thickness of the reflective pad may be about 10 nm to about 50 nm.

The reflective pad may be circular or polygonal having an area of about 5 $\mu m^2$ to about 25 $\mu m^2$.

The comparing of the simulated reflectance spectrum with the actually measured reflectance spectrum may include preparing the simulated reflectance spectrum through simulation with respect to a plurality of discrete thicknesses of the second dielectric; and comparing a reflectance peak wavelength or an absorbance peak wavelength of the simulated reflectance spectrum with a reflectance peak wavelength or an absorbance peak wavelength of the actually measured reflectance spectrum.

The determining of the polishing speed, the thickness of the second dielectric, and the end time of the planarizing may include finding and selecting the simulated reflectance spectrum having the reflectance peak wavelength or the absorbance peak wavelength that is identical to the reflectance peak wavelength or the absorbance peak wavelength of the actually measured reflectance spectrum; and estimating the thickness of the second dielectric corresponding to the selected simulated reflectance spectrum as an actual thickness of the second dielectric.

In accordance with an aspect of the disclosure, a planarizing apparatus includes a carrier configured to support and rotate a wafer, the wafer including a reflective pad; a polishing pad configured to polish a planarization target surface of the wafer; a light source configured to irradiate illumination light to the wafer for planarization monitoring; a photodetector configured to detect reflected light reflected from the wafer; and a processor configured to calculate a polishing speed and a thickness of a planarization target layer by analyzing spectrum information of the reflected light provided from the photodetector, wherein the processor is further configured to prepare a simulated reflectance spectrum through simulation with respect to a plurality of discrete thicknesses of the planarization target layer; obtain an actually measured reflectance spectrum using the reflected light reflected from the reflective pad of the wafer; and determine the polishing speed, the thickness of the planarization target layer, and an end time of planarization by comparing the simulated reflectance spectrum with the actually measured reflectance spectrum.

The processor may be further configured to find and select the simulated reflectance spectrum having a reflectance peak wavelength or an absorbance peak wavelength identical to a reflectance peak wavelength or an absorbance peak wavelength of the actually measured reflectance spectrum; and estimate the thickness of the planarization target layer corresponding to the selected simulated reflectance spectrum as an actual thickness of the planarization target layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
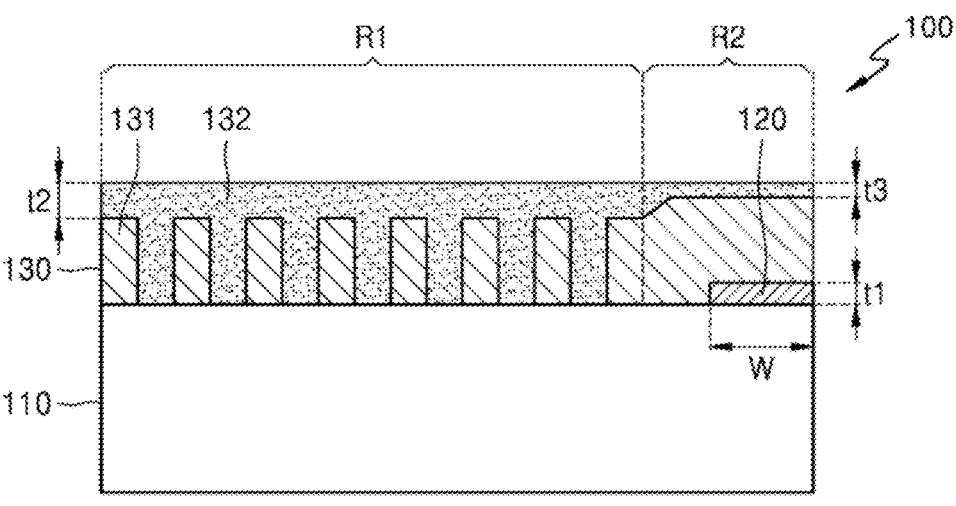
FIG. 1 is a cross-sectional view schematically illustrating a structure of an optical apparatus including a multilayered optical thin film structure according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, with reference to the accompanying drawings, a magnetic tunneling junction device and a memory device including the magnetic tunneling junction device will be described in detail. Like reference numerals refer to like elements throughout, and in the drawings, sizes of elements may be exaggerated for clarity and convenience of explanation. Embodiments described below are merely examples, and various modifications may be possible from the embodiments.

In a layer structure described below, an expression "above" or "on" may include not only "immediately on in a contact manner" but also "on in a non-contact manner". An expression used in the singular encompasses the expression of the plural, unless it has a clearly different meaning in the context. It will be further understood that the terms "comprises" and/or "comprising" used herein specify the presence of stated features or elements, but do not preclude the presence or addition of one or more other features or elements.

The use of "the" and other demonstratives similar thereto may correspond to both a singular form and a plural form. Unless the order of operations of a method according to the disclosure is explicitly mentioned or described otherwise, the operations may be performed in a proper order. The disclosure is not limited to the order in which the operations are mentioned.

The terms used in the embodiments such as "unit" or "module" indicates a unit for processing at least one function or operation, and may be implemented in hardware or software, or in a combination of hardware and software.

The connecting lines, or connectors shown in the various figures presented are intended to represent functional relationships and/or physical or logical couplings between the various elements. It should be noted that many alternative or additional functional relationships, physical connections or logical connections may be present in a practical device.

The use of any and all examples, or language provided herein, is intended merely to better illuminate the disclosure and does not pose a limitation on the scope of the disclosure unless otherwise claimed.

FIG. 1 is a cross-sectional view schematically illustrating a structure of an optical apparatus 100 including a multi-layered optical thin film structure according to an embodiment. Referring to FIG. 1, the optical apparatus 100 may include the multilayered optical thin film structure in which a plurality of optical thin film layers having different functions or configurations are disposed. For example, the optical apparatus 100 may include a lower optical layer 110 and a nanostructure layer 130 disposed on the lower optical layer 110. The nanostructure layer 130 may include a patterned first dielectric 131 and a second dielectric 132 filled between patterns of the first dielectric 131. The first dielectric 131 and the second dielectric 132 may include different dielectric materials (e.g., a first material and a second material, respectively) having different refractive indices from each other. The second dielectric 132 may be disposed to completely cover an upper surface of the first dielectric 131 as well as to be filled between the patterns of the first dielectric 131.

The lower optical layer 110 is a layer capable of performing various optical functions along with supporting the nanostructure layer 130. In FIG. 1, the lower optical layer 110 is simply shown as one layer for convenience, but the lower optical layer 110 may include a plurality of layers and structures. For example, when the optical apparatus 100 is an image sensor, the lower optical layer 110 may include light sensors converting incident light into an electrical signal and a driving circuit. When the optical apparatus 100 is a light emitting element or a display apparatus, the lower optical layer 110 may include light emitting elements and a driving circuit. The optical apparatus 100 may be a passive optical element. In this case, the lower optical layer 110 may include a multilayered structure serving as a resonator, a reflector, etc. to assist an operation of the nanostructure layer 130. Also, the lower optical layer 110 may include both an active element and a passive optical element.

The nanostructure layer 130 may include a meta structure configured to perform a predetermined optical action according to a pattern form of the first dielectric 131. For example, the first dielectric 131 of the nanostructure layer 130 may be patterned to serve as at least one of a lens, a prism, a polarizer, a color filter, or a spectral filter. Each of the patterns of the first dielectric 131 may have a size smaller than that of the wavelength of visible light. For example, a width or a diameter of each pattern of the first dielectric 131 may be about 10 nm to about 400 nm, about 10 nm to about 300 nm, or about 10 nm to about 200 nm, and a thickness of each pattern of the first dielectric 131 (e.g., a dimension in the thickness direction of the nanostructure layer 130) may be about 100 nm to about 1500 nm. The patterns of the first dielectric 131 may have two-dimensionally arranged cylindrical or polygonal columns, or may have one-dimensionally arranged bars. The optical action of the meta structure may be determined by the pattern form of the first dielectric 131, an arrangement form of the patterns of the first dielectric 131, the size and thickness of the pattern of the first dielectric 131, a refractive index of a dielectric material of the first dielectric 131, a refractive index of a dielectric material of the second dielectric 132, etc.

In addition, the nanostructure layer 130 may include an active region R1 having an optically effective action and a non-active region R2 disposed adjacent to a periphery of the active region R1 and independent of the optical operation. For example, the non-active region R2 may be located near one edge of the nanostructure layer 130. The first dielectric 131 of the nanostructure layer 130 may be patterned only in the active region R1, and the first dielectric 131 in the non-active region R2 may not be patterned. In other words, a region that performs an effective optical action such as that of a lens, a prism, a polarizer, a color filter, a spectral filter, etc. because the meta structure is formed may be regarded as the active region R1, and a region that does not perform an optical function because the meta structure is not present may be regarded as the non-active region R2.

The optical apparatus 100 may further include a reflective pad 120 disposed between the lower optical layer 110 and the nanostructure layer 130 to face the non-active region R2 of the nanostructure layer 130. For example, the reflective pad 120 may be disposed on one edge of the upper surface of the lower optical layer 110 in the non-active region R2. The first dielectric 131 on the lower optical layer 110 may be disposed to cover the reflective pad 120 in the non-active region R2. The first dielectric 131 has a constant thickness in the entire area of the optical apparatus 100. Accordingly, the first dielectric 131 has a step difference between the active region R1 and the non-active region R2 due to the reflective pad 120. In other words, a height of the upper surface of the first dielectric 131 in the non-active region R2 may be higher than a height of the upper surface of the first dielectric 131 in the active region R1.

The upper surface of the second dielectric 132 covering the first dielectric 131 may have a planar surface over the entire region of the optical apparatus 100. Accordingly, a thickness t2 of the second dielectric 132 on the upper surface of the first dielectric 131 in the active region R1 may be greater than a thickness t3 of the second dielectric 132 on the upper surface of the first dielectric 131 in the non-active region R2 by a thickness t1 of the reflective pad 120. In other words, the thickness t2 of the second dielectric 132 on the upper surface of the first dielectric 131 in the active region R1 may be the same as a sum (t1+t3) of the thickness t1 of the reflective pad 120 and the thickness t3 of the second dielectric 132 on the upper surface of the first dielectric 131 in the non-active region R2.

The reflective pad 120 may be used for endpoint detection during a planarization process of the second dielectric 132 which will be described below. Because the reflective pad 120 is disposed only in the non-active region R2, the reflective pad 120 does not substantially affect the operation of the optical apparatus 100 and will be used only during manufacturing of the optical apparatus 100. When manufacturing the optical apparatus 100, by monitoring a spectrum of light reflected from the reflective pad 120 during the planarization process of the second dielectric 132, it is possible to precisely control the thickness t2 of the second dielectric 132 on the upper surface of the first dielectric 131 in the active region R1 without being subject to error caused by the presence of the lower optical layer 110. The planarization process of the second dielectric 132 will be described below in more detail.

The reflective pad 120 may include a metal material having a relatively high reflectance. For example, the reflective pad 120 may include at least one of gold (Au), silver (Ag), aluminum (Al), copper (Cu), tungsten (W), molybdenum (Mo), or platinum (Pt), or an alloy thereof. The thickness t1 of the reflective pad 120 may be equal to or greater than about 10 nm so that the reflective pad 120 has a sufficiently high reflectance. In addition, the thickness t1 of the reflective pad 120 may be equal to or smaller than about 50 nm, to minimize the step difference of the first dielectric 131 and appropriately select the thickness of the second dielectric 132. In other words, the thickness t1 of the reflective pad 120 may be about 10 nm to about 50 nm. In addition, the reflective pad 120 may have an appropriate area so that the non-active region R2 is not excessively large while sufficiently reflecting light during the planarization process of the second dielectric 132 which will be described below. For example, the area of the reflective pad 120 may be about 5 $\mu m^2$ to about 25 $\mu m^2$. In addition, a width W or a diameter of the reflective pad 120 may be, for example, about 2 $\mu m$ to about 5 $\mu m$.

Figure 2:
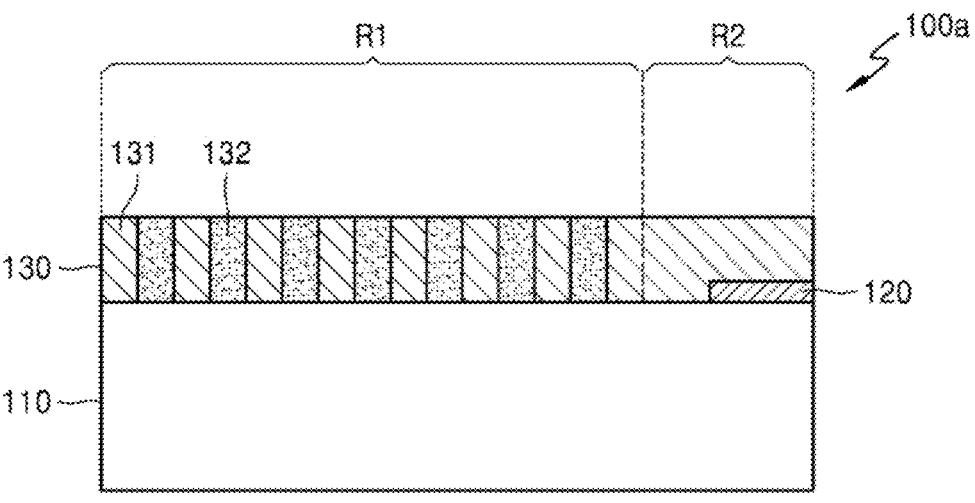
FIG. 2 is a cross-sectional view schematically illustrating a structure of an optical apparatus according to an embodiment.

FIG. 2 is a cross-sectional view schematically illustrating a structure of an optical apparatus 100a according to an embodiment. Referring to FIG. 2, in the optical apparatus 100a, an upper surface of the first dielectric 131 and an upper surface of the second dielectric 132 may have the same height. In this case, the first dielectric 131 and the second dielectric 132 may have a planar and common upper surface in the entire region of the optical apparatus 100a. In the active region R1, the second dielectric 132 is disposed only between patterns of the first dielectric 131 and is not present on the upper surface of the first dielectric 131. Also, the second dielectric 132 is not present in the non-active region R2. Also, a thickness of the first dielectric 131 in the active region R1 may be greater than a thickness of the first dielectric 131 on the reflective pad 120. The remaining components of the optical apparatus 100a are the same as those of the optical apparatus 100 shown in FIG. 1, and thus descriptions thereof will be omitted.

Figure 3:
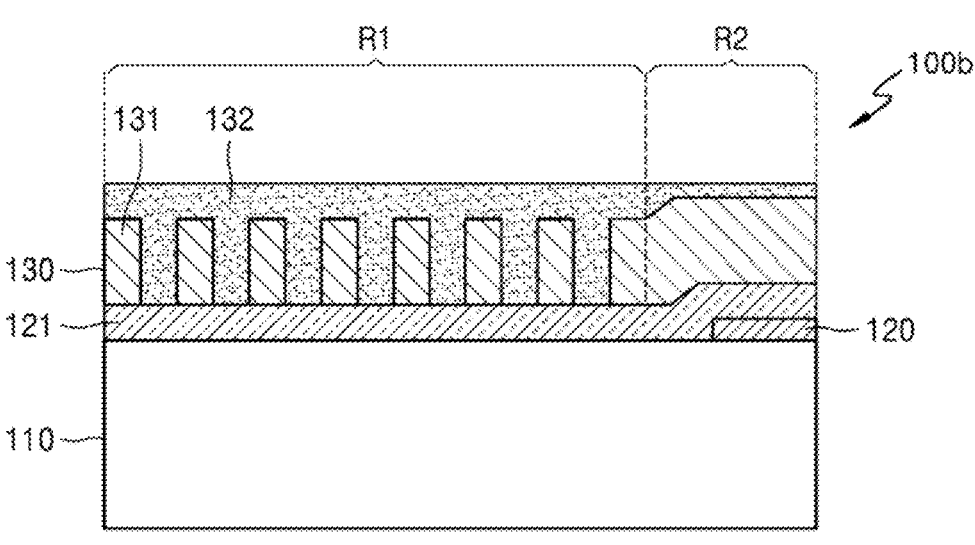
FIG. 3 is a cross-sectional view schematically illustrating a structure of an optical apparatus according to an embodiment.

FIG. 3 is a cross-sectional view schematically illustrating a structure of an optical apparatus 100b according to an embodiment. Referring to FIG. 3, the optical apparatus 100b may further include an etch stop layer 121 disposed to cover the lower optical layer 110 and the reflective pad 120. The nanostructure layer 130 may be disposed on the etch stop layer 121. In other words, the etch stop layer 121 may be disposed between the nanostructure layer 130 and the lower optical layer 110. The etch stop layer 121 has a step difference between the active region R1 and the non-active region R2 due to the reflective pad 120. In other words, a height of an upper surface of the etch stop layer 121 in the non-active region R2 may be higher than a height of an upper surface of the etch stop layer 121 in the active region R1 by a thickness of the reflective pad 120. The etch stop layer 121 may serve to determine an etching end time of the first dielectric 131 during a patterning process of the first dielectric 131 which will be described below and to protect the lower optical layer 110. The etch stop layer 121 may include, for example, at least one material selected from aluminum oxide ($Al_2O_3$), hafnium oxide ($HfO_2$), and silicon nitride ($SiN_x$). The thickness of the etch stop layer 121 may be, for example, about 3 nm to about 50 nm, or about 5 nm to about 15 nm. The remaining components of the optical apparatus 100b are the same as those of the optical apparatus 100 shown in FIG. 1, and thus descriptions thereof will be omitted.

FIGS. 4A to 4D are cross-sectional views schematically illustrating a process of manufacturing the optical apparatus 100*b* illustrated in FIG. 3.

Figure 4A:
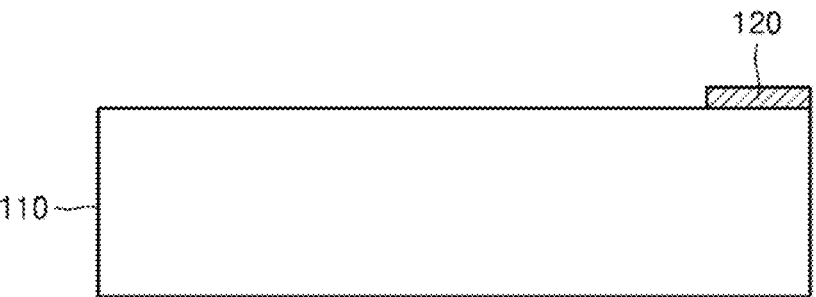
FIGS. 4A to 4D are cross-sectional views schematically illustrating a process of manufacturing the optical apparatus illustrated in FIG. 3.

Referring to FIG. 4A, the lower optical layer 110 is first formed. A structure of the lower optical layer 110 may be determined according to the purpose of the optical apparatus 100*b*. As described above, the lower optical layer 110 may have a structure including an active element such as an optical sensor, a light emitting element, a driving circuit, etc., a passive element such as a resonator, a reflector, etc., or both the active element and the passive element. Then, the reflective pad 120 may be formed on the lower optical layer 110. The reflective pad 120 may be formed in an edge region of the upper surface of the lower optical layer 110, which is the non-active region R2 where the first dielectric 131 is not patterned during a subsequent process. For example, the reflective pad 120 may be formed in an edge part of the upper surface of the lower optical layer 110, by depositing a reflective metal material on the entire upper surface of the lower optical layer 110 to a thickness of about 10 nm to about 50 nm, and then pattering the reflective metal material. The reflective pad 120 may be formed, for example, in a circular or polygonal shape having a width or a diameter of about 2 μm to about 5 μm.

A large number of optical apparatuses may be simultaneously formed on a single wafer, and the reflective pad 120 need not be formed on all the optical apparatuses. The reflective pad 120 may be selectively formed on only a few optical apparatuses among a plurality of optical apparatuses formed on one wafer. For example, only about 2 to 10 reflective pads 120 may be formed on one wafer.

Figure 5:
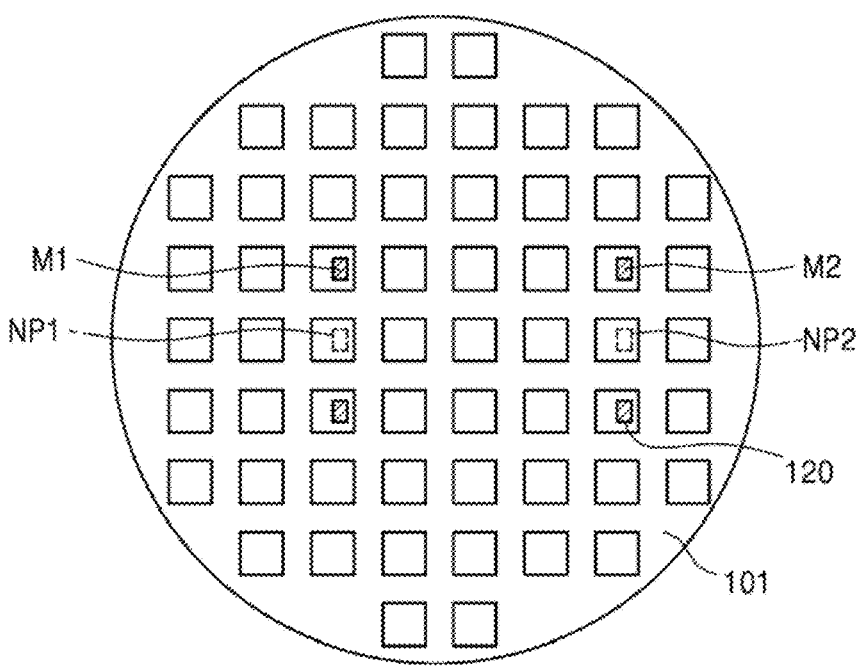
FIG. 5 is a plan view illustrating locations of a plurality of reflective pads arranged on a wafer for manufacturing a plurality of optical apparatuses.

FIG. 5 is a plan view illustrating locations of a plurality of reflective pads 120 arranged on a wafer 101 for manufacturing a plurality of optical apparatuses. A plurality of squares indicated by solid lines in FIG. 5 are regions in which optical apparatuses are to be formed on the wafer 101. In FIG. 5, it is illustrated that the reflective pads 120 are formed only on edges of four regions among a plurality of regions where the optical apparatuses are to be formed. The number of reflective pads 120 may be appropriately selected in consideration of the size of the wafer 101, a process error, etc. In FIGS. 5, M1 and M2 denote locations to monitor a spectrum of light reflected from the reflective pads 120 during a subsequent planarization process. In addition, NP1 and NP2 denote locations to monitor a spectrum of light reflected from the lower optical layer 110 without the reflective pad 120 for a comparative example during the subsequent planarization process.

Figure 4B:
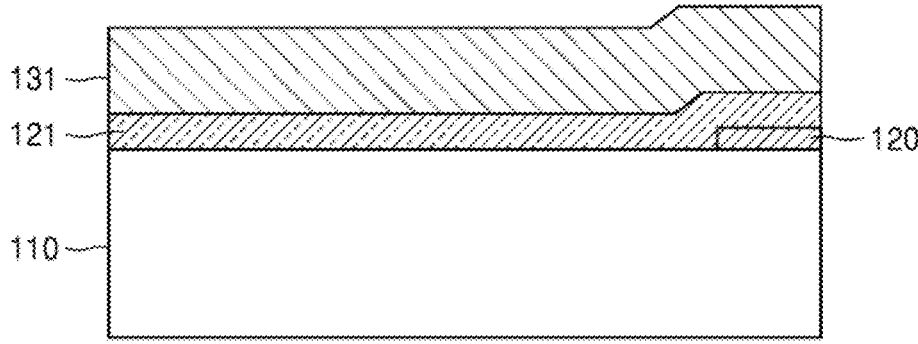

Referring to FIG. 4B, the etch stop layer 121 may be formed to a constant thickness to cover both the lower optical layer 110 and the reflective pad 120. Then, the first dielectric 131 may be formed with a constant thickness on the entire upper surface of the etch stop layer 121. For example, the etch stop layer 121 may be formed to a thickness of about 3 nm to about 50 nm or about 5 nm to about 15 nm. Also, the first dielectric 131 may be formed to a thickness of about 100 nm to about 1500 nm. Due to the reflective pad 120 disposed on the edge of the lower optical layer 110, the edge part of the etch stop layer 121 covering the reflective pad 120 may protrude upward relative to other parts of the etch stop layer 121. Similarly, an edge part of the first dielectric 131 on the reflective pad 120 may protrude upward relative to other parts of the first dielectric 131. Accordingly, each of the etch stop layer 121 and the first dielectric 131 may have a stepped shape.

Figure 4C:
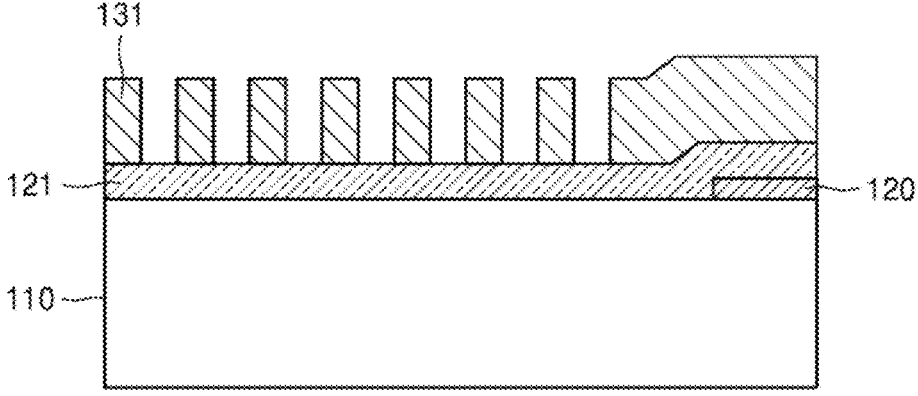

Referring to FIG. 4C, the first dielectric 131 may be patterned. For example, the first dielectric 131 may be patterned using lithography and etching technologies, and etching may be stopped when the etch stop layer 121 is exposed. A pattern shape of the first dielectric 131 may be determined according to the purpose of the optical apparatus. For example, the first dielectric 131 may be patterned to serve as at least one of a lens, a prism, a polarizer, a color filter, or a spectral filter. Patterning of the first dielectric 131 may be performed only on the first dielectric 131 in the active region having an optically effective function, and the first dielectric 131 in a non-active region in which the reflective pad 120 is located is not patterned.

Figure 4D:
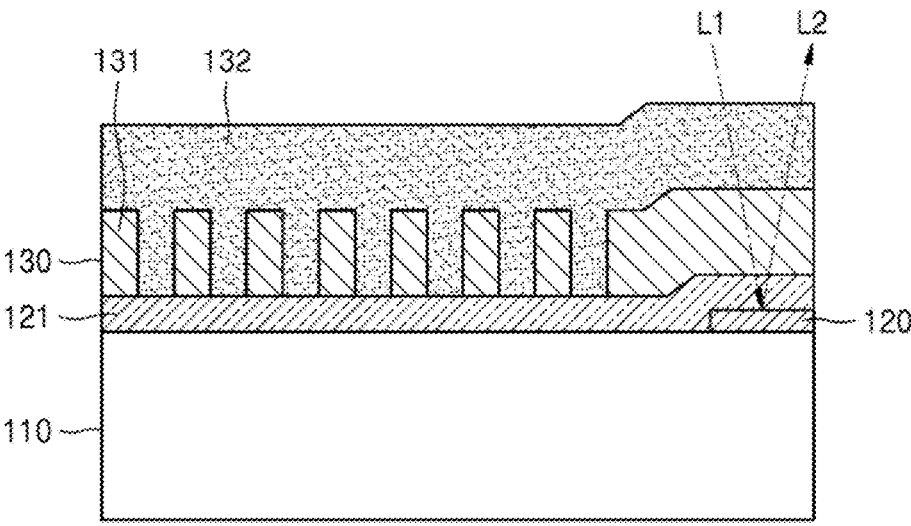

Referring to FIG. 4D, the second dielectric 132 may be formed to completely cover the first dielectric 131. The second dielectric 132 may include a dielectric material having a refractive index different from that of the first dielectric 131. The second dielectric 132 may be formed to completely fill space between patterns of a plurality of patterns of the first dielectric 131. For example, the second dielectric 132 may be formed by chemical vapor deposition (CVD) or atomic layer deposition (ALD). In addition, the second dielectric 132 may be formed to a predetermined thickness on the upper surface of the first dielectric 131. In this case, the edge part of the second dielectric 132 on the reflective pad 120 may protrude upward relative to other parts of the second dielectric 132.

After the second dielectric 132 is formed, a planarization process may be performed to planarize the upper surface of the second dielectric 132 having a step difference. The planarization process may be performed, for example, by chemical mechanical polishing (CMP). As the planarization process progresses, a thickness of the second dielectric 132 remaining on the upper surface of the first dielectric 131 gradually decreases. When the planarization process ends, the entire upper surface of the second dielectric 132 may be in a flat state. The performance of the optical apparatus may vary according to the thickness of the second dielectric 132 remaining after the planarization process. Therefore, during the planarization process, it is important to precisely control the thickness of the second dielectric 132 on the upper surface of the first dielectric 131 to approximate a target thickness.

According to an embodiment, by monitoring a spectrum of light reflected from the reflective pad 120 during the planarization process, a polishing speed and the thickness of the second dielectric 132 may be estimated, a planarization deviation may be uniformly controlled, and an end time of planarizing may be determined. For example, white illumination light L1 may be irradiated to the reflective pad 120 by an in-situ method or an ex-situ method while the planarization process is performed, and reflected light L2 from the reflective pad 120 may be detected. Then, by comparing an expected spectrum of the reflected light L2 according to the thickness of the second dielectric 132 obtained through simulation with a spectrum obtained by actually measuring the reflected light L2, the polishing speed and the thickness of the second dielectric 132 may be estimated.

Figure 6A:
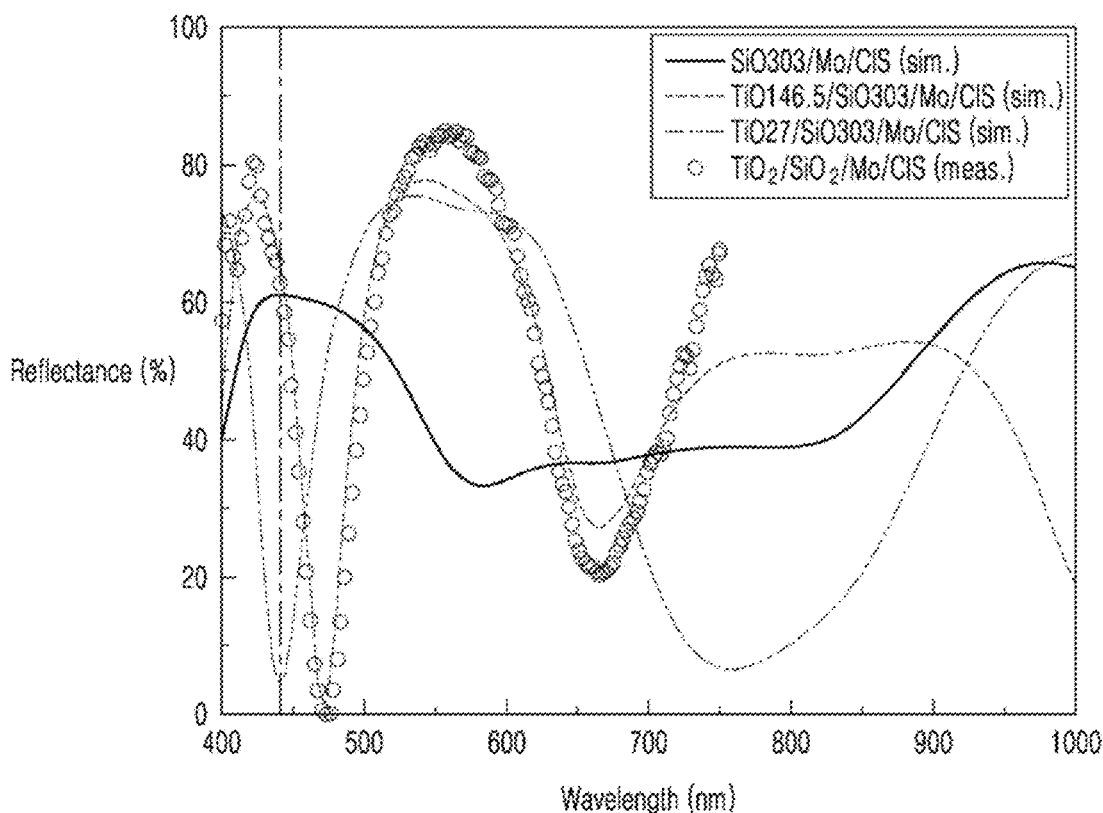
FIGS. 6A and 6B are graphs showing a comparison of reflectance spectra at a first location and a second location where a reflective pad is formed.
Figure 6B:
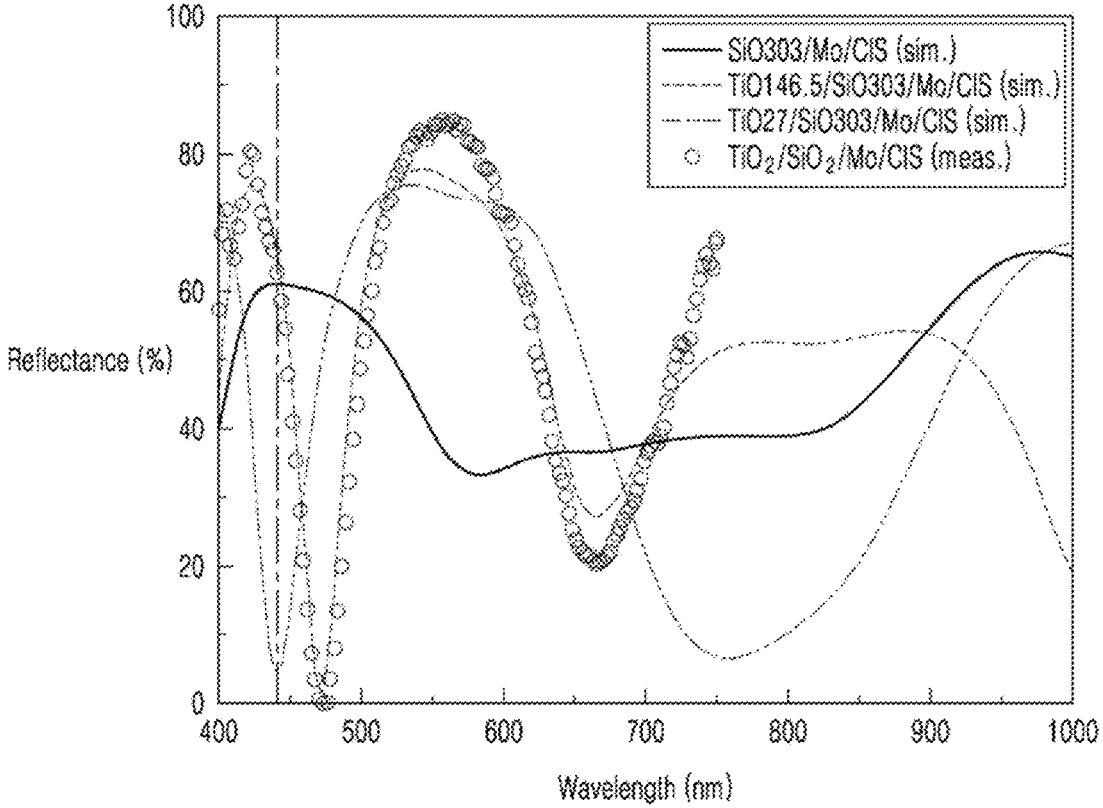
Figure 7A:
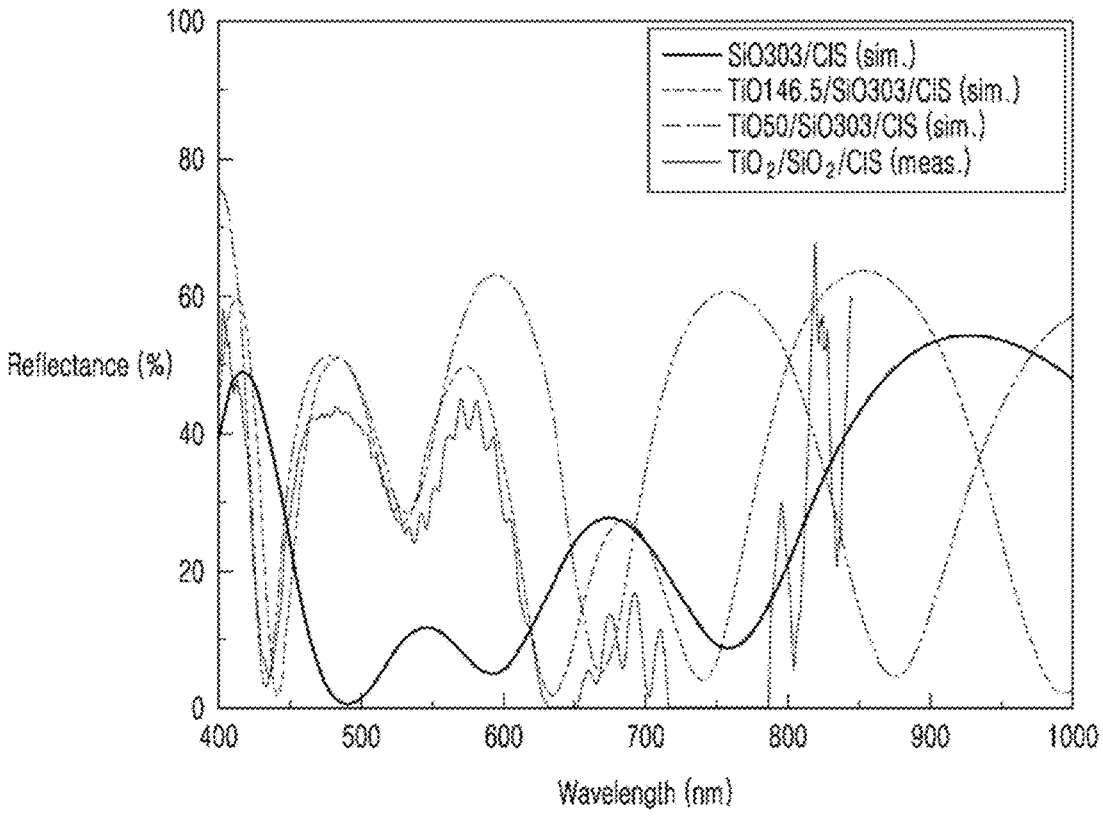
FIGS. 7A and 7B are graphs showing a comparison of reflectance spectra at a third location and a fourth location where a reflective pad is not formed.
Figure 7B:
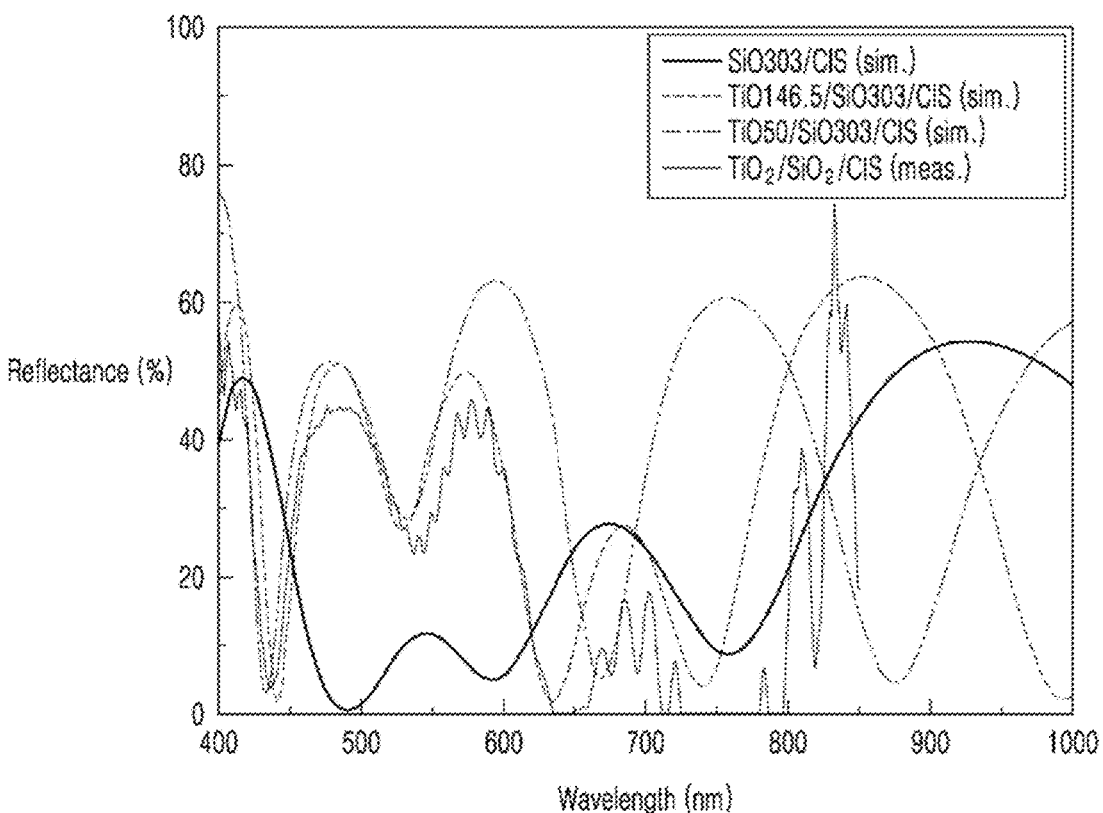

For example, FIGS. 6A and 6B are graphs showing a comparison of reflectance spectra at a first location M1 and a second location M2, respectively, where the reflective pad 120 is formed, and FIGS. 7A and 7B are graphs showing a comparison of reflectance spectra at a third location NP1 and a fourth location NP2, respectively, where the reflective pad 120 is not formed. The graphs shown in FIGS. 6A to 7B are obtained from an example that the lower optical layer 110 is a complementary metal-oxide-semiconductor (CMOS) image sensor (CIS), the first dielectric 131 is $SiO_2$ having a thickness of 303 nm, the reflective pad 120 is Mo having a thickness of 23 nm, the etch stop layer 121 is $HfO_2$, and the second dielectric 132 is $TiO_2$.

In FIGS. 6A and 6B, the graph indicated by the solid line is a result of simulating the spectrum of the reflected light L2 when the second dielectric 132 is not present on the first dielectric 131 at the first and second locations M1 and M2. The graph indicated by the dotted line is a result of simulating the spectrum of the reflected light L2 when the thickness of the second dielectric 132 is 146.5 nm. The graph indicated by the chain line is a result of simulating the spectrum of the reflected light L2 when the thickness of the second dielectric 132 is 27 nm. In addition, the graph indicated by a circle is a result of actually measuring the reflected light L2. Referring to FIGS. 6A and 6B, when the second dielectric 132 is not present on the first dielectric 131 at the first and second locations M1 and M2 where the reflective pad 120 is formed, a relatively simple reflectance spectrum is formed. After the second dielectric 132 is deposited on the first dielectric 131, a reflectance spectrum having a plurality of reflectance peaks may be formed. In addition, as the thickness of the second dielectric 132 decreases by a planarization process, the reflectance spectrum approaches the reflectance spectrum when the second dielectric 132 is not present. When the reflectance spectrum obtained by actually measuring the reflected light L2 in FIGS. 6A and 6B is compared with the simulation result, it may be seen that the thickness of the second dielectric 132 is approximately 146.5 nm. In addition, it may be seen that the reflectance spectra actually measured at the first and second locations M1 and M2, which are different from each other, are substantially the same.

In FIGS. 7A and 7B, the graph indicated by the thick solid line is a result of simulating the spectrum of the reflected light L2 when the second dielectric 132 is not present on the first dielectric 131 at the third and fourth locations NP1 and NP2. The graph indicated by the dotted line is a result of simulating the spectrum of the reflected light L2 when the thickness of the second dielectric 132 is 146.5 nm. The graph indicated by the chain line is a result of simulating the spectrum of the reflected light L2 when the thickness of the second dielectric 132 is 50 nm. In addition, the graph indicated by the thin solid line is a result of actually measuring the reflected light L2. Comparing with the graphs of FIGS. 6A and 6B, it may be seen that a relatively complex reflectance spectrum having a large number of reflectance peaks is formed at the third and fourth locations NP1 and NP2 where the reflective pad 120 is not formed. This result is obtained because the illumination light L1 is reflected from various layers or various structures in the lower optical layer 110. Therefore, it may be relatively difficult to compare the reflectance spectrum obtained by actually measuring the reflected light L2 with the simulation result. In addition, because the thicknesses of layers in the lower optical layer 110 are not uniform according to locations, the reflectance spectra obtained at the third locations NP1 and fourth locations NP2 which are different from each other may be slightly different from each other. Therefore, it may be difficult to accurately estimate the thickness of the second dielectric 132, and a large error may occur in the estimated thickness value.

Figure 8A:
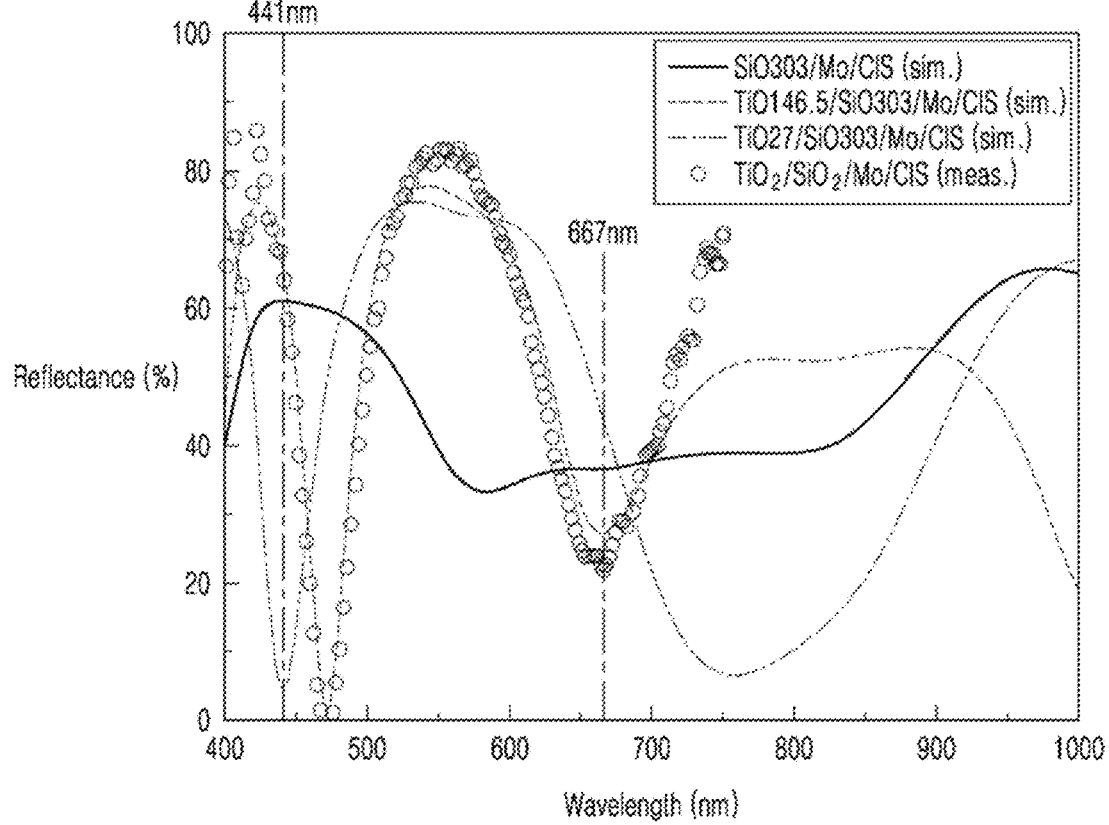
FIGS. 8A to 8C illustrate changes in a reflectance spectrum at a first location where a reflective pad is formed according to the progress of a planarization process.
Figure 8B:
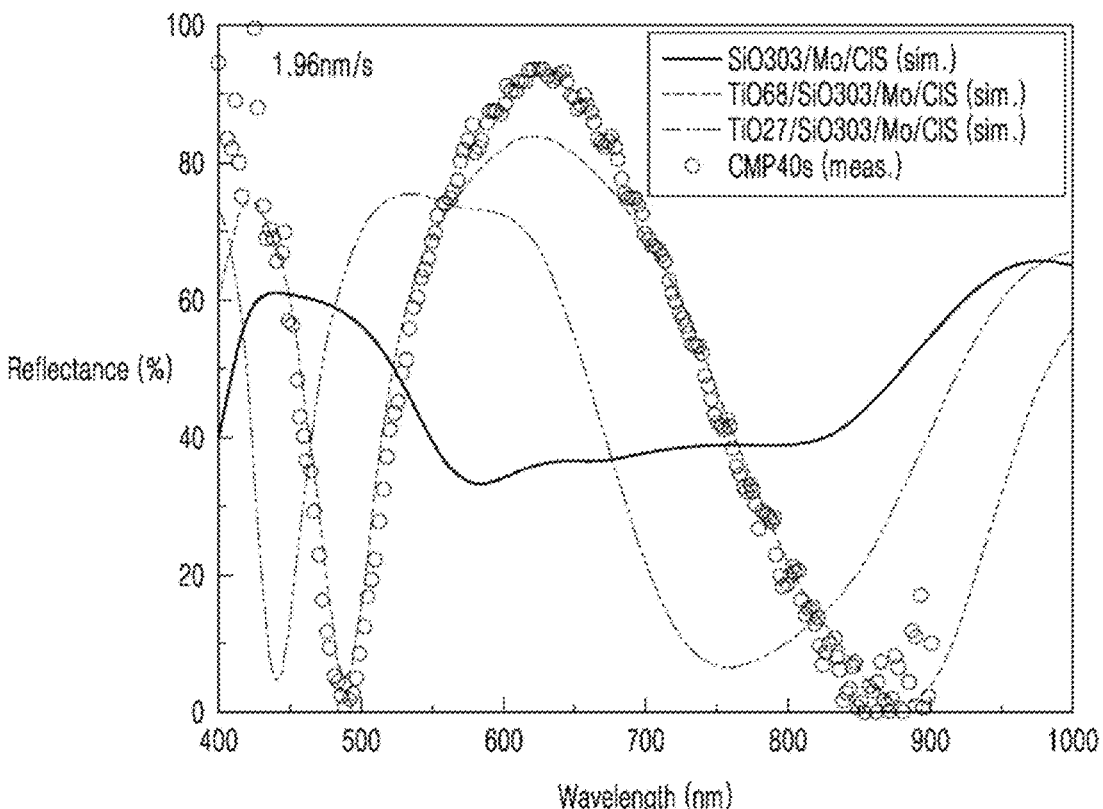
Figure 8C:
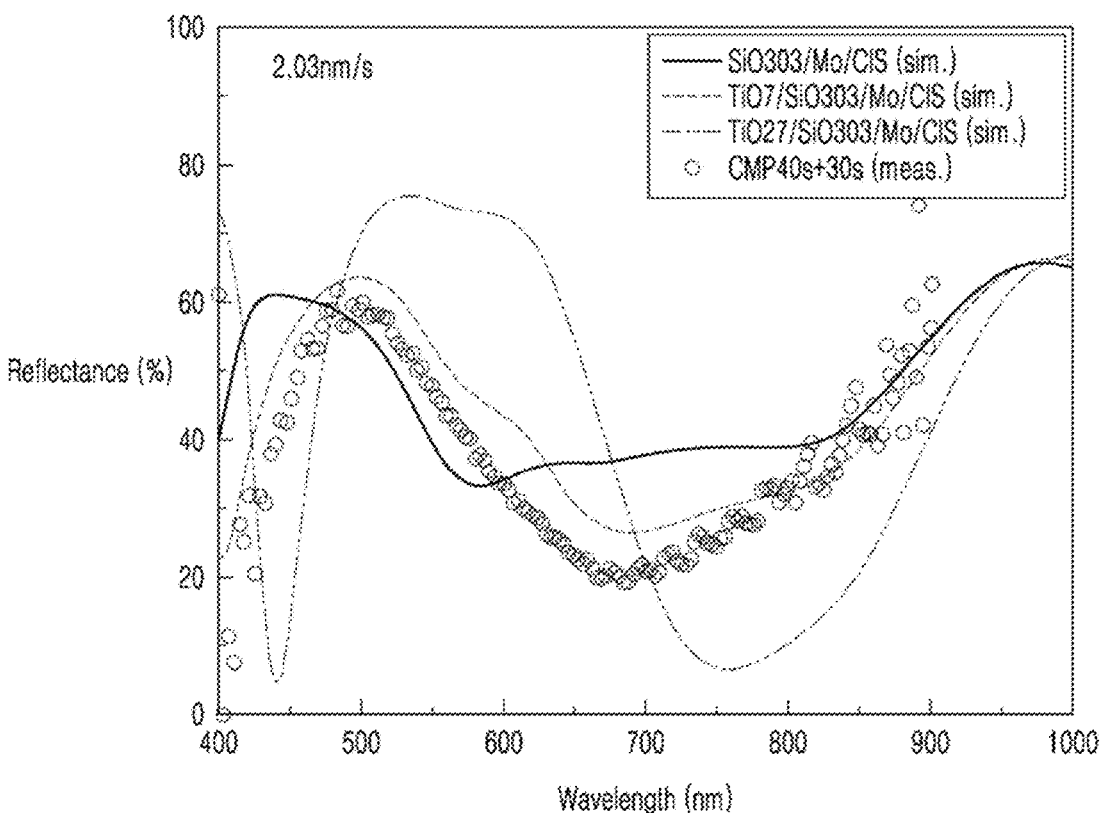

FIGS. 8A to 8C illustrate changes in a reflectance spectrum at the first location M1 where the reflective pad 120 is formed according to the progress of a planarization process. The graph indicated by the dotted line in FIG. 8A is a result of simulating a spectrum of the reflected light L2 when the thickness of the second dielectric 132 is 146.5 nm. The graph indicated by the dotted line in FIG. 8B is a result of simulating the spectrum of the reflected light L2 when the thickness of the second dielectric 132 is 68 nm. The graph indicated by the dotted line in FIG. 8C is a result of simulating the spectrum of the reflected light L2 when the thickness of the second dielectric 132 is 7 nm. In FIGS. 8A to 8C, the graph indicated by the thick solid line is a result of simulating the spectrum of the reflected light L2 when the second dielectric 132 is not present on the first dielectric 131. The graph indicated by the chain line is a result of simulating the spectrum of the reflected light L2 when the thickness of the second dielectric 132 is 27 nm. The graph indicated by the circle is a result of actually measuring the reflected light L2. Upon comparing a reflectance spectrum obtained by actually measuring the reflected light L2 with a reflectance spectrum obtained through simulation, it may be seen that the thickness of the second dielectric 132 is approximately 146.5 nm at an initial stage (FIG. 8A) of a planarization process. After the planarization process is performed for 40 seconds (FIG. 8B), the thickness of the second dielectric 132 is approximately 68 nm, and a polishing speed at this time is therefore approximately 1.96 nm/s. In addition, it may be seen that after the planarization process is further performed for 30 more seconds (FIG. 8C), the thickness of the second dielectric 132 is approximately 7 nm, and the polishing speed is approximately 2.03 nm/s.

When comparing the reflectance spectrum obtained by actually measuring the reflected light L2 with the reflectance spectrum obtained through simulation, a reflectance profile may be compared over the entire wavelength band. Alternatively, only the reflectance peak wavelength and/or the absorbance peak wavelength may be selected and compared. For example, among reflectance spectra obtained by previous simulations with respect to various thicknesses of the second dielectric 132 (hereinafter, "simulated reflectance spectra"), one simulated reflectance spectrum having a reflectance peak wavelength and/or absorbance peak wavelength identical to a reflectance peak wavelength and/or absorbance peak wavelength of the reflectance spectrum obtained by actually measuring the reflected light L2 (hereinafter, "actually measured reflectance") may be found and selected. Then, the thickness of the second dielectric 132 corresponding to the selected simulated reflectance spectrum may be estimated as the actual thickness of the second dielectric 132.

When two or more reflectance peaks are present in the actually measured reflectance spectrum, only one wavelength with the highest reflectance may be selected to compare the actually measured reflectance spectrum with the simulated reflectance spectrum, or two wavelengths may be also selected in the order of the highest reflectance to compare the actually measured reflectance spectrum with the simulated reflectance spectrum. Alternatively, at least one wavelength in the order of high reflectance and at least one wavelength in the order of low reflectance (e.g., in the order of high absorbance) may be selected to compare the actually measured reflectance spectrum with the simulated reflectance spectrum. In order to reduce a computational amount, a plurality of simulated reflectance spectra may be previously calculated with respect to a plurality of discrete thicknesses of the second dielectric 132. When there is no simulated reflectance spectrum exactly identical to the selected reflectance peak wavelength and/or absorbance peak wavelength in the actually measured reflectance spectrum, two simulated reflectance spectra closest to the selected reflectance peak wavelength and/or absorbance peak wavelength may be found to estimate the actual thickness of the second dielectric 132 through interpolation.

Figure 9A:
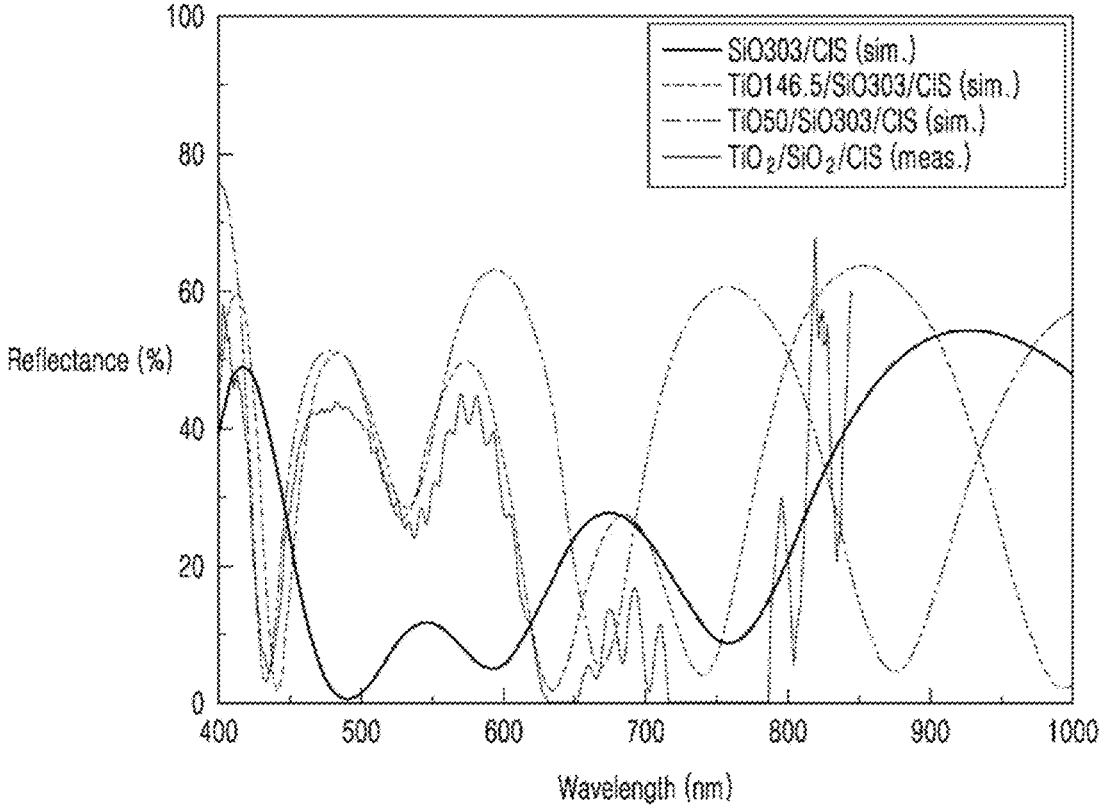
FIGS. 9A to 9C illustrate changes in a reflectance spectrum at a third location where a reflective pad is not formed according to the progress of a planarization process.
Figure 9B:
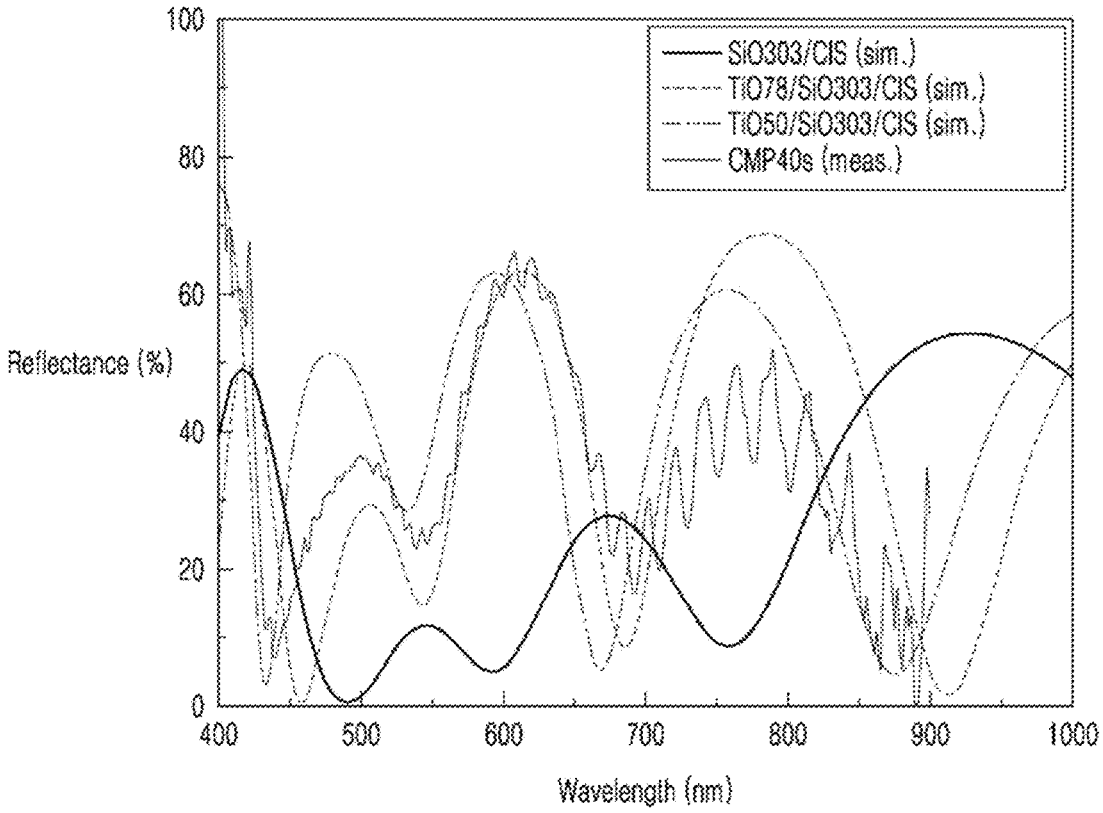
Figure 9C:
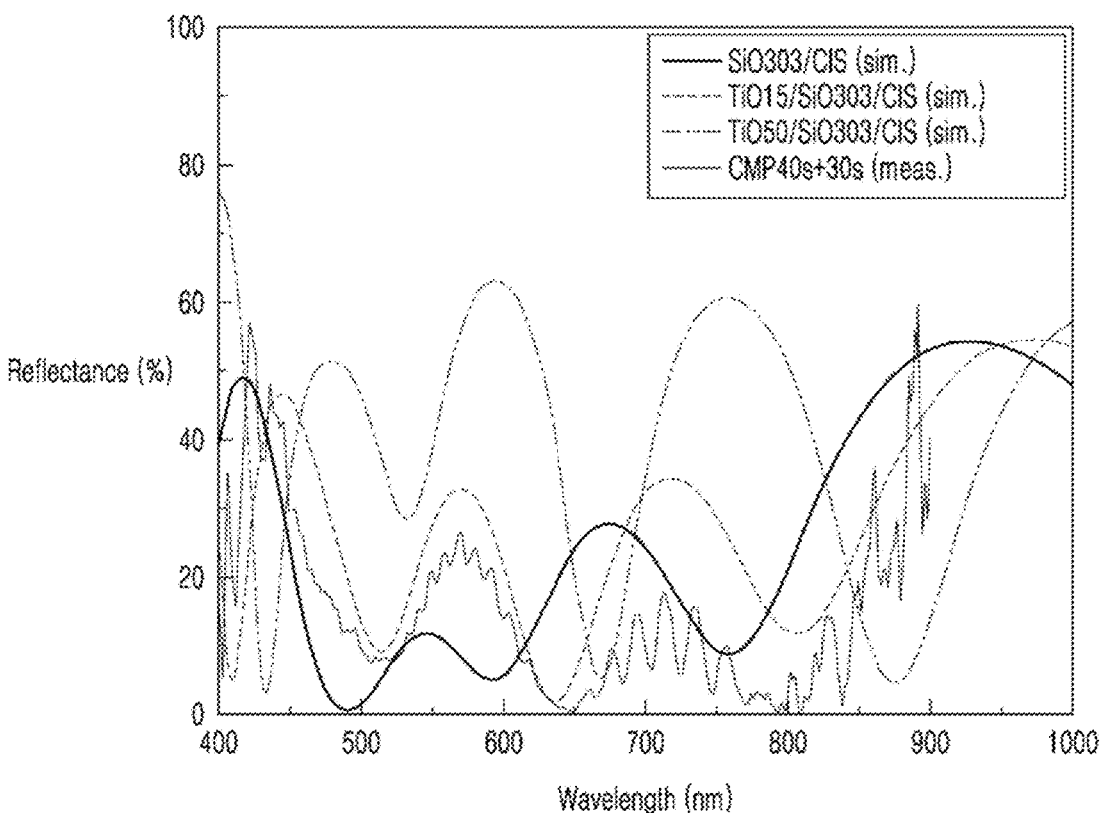

FIGS. 9A to 9C illustrate changes in a reflectance spectrum at the third location NP1 where the reflective pad 120 is not formed according to the progress of a planarization process. A graph indicated by the dotted line in FIG. 9A is a result of simulating a spectrum of the reflected light L2 when the thickness of the second dielectric 132 is 146.5 nm. A graph indicated by the dotted line in FIG. 9B is a result of simulating the spectrum of the reflected light L2 when the thickness of the second dielectric 132 is 78 nm. A graph indicated by the dotted line in FIG. 9C is a result of simulating the spectrum of the reflected light L2 when the thickness of the second dielectric 132 is 15 nm. In FIGS. 9A to 9C, a graph indicated by the thick solid line is the result of simulating the spectrum of the reflected light L2 when the second dielectric 132 is not present on the first dielectric 131. A graph indicated by the chain line is the result of simulating the spectrum of the reflected light L2 when the thickness of the second dielectric 132 is 50 nm. A graph indicated by the thin solid line is the result of actually measuring the reflected light L2. FIG. 9A shows the result of an initial stage of a planarization process, FIG. 9B shows the result after performing the planarization process for 40 seconds, and FIG. 9C shows the result after further performing the planarization process for 30 seconds.

Upon comparing FIGS. 8B and 9B, after the planarization process is performed for 40 seconds, the thickness of the second dielectric 132 is estimated to be 68 nm at the first location M1 where the reflective pad 120 is formed, whereas the thickness of the second dielectric 132 is estimated to be 78 nm at the third location NP1 where the reflective pad 120 is not formed. In addition, upon comparing FIGS. 8C and 9C, after the planarization process is further performed for 30 seconds, the thickness of the second dielectric 132 is estimated to be 7 nm at the first location M1 where the reflective pad 120 is formed, whereas the thickness of the second dielectric 132 is estimated to be 15 nm at the third location NP1 where the reflective pad 120 is not formed.

Figures 10A, 10B:
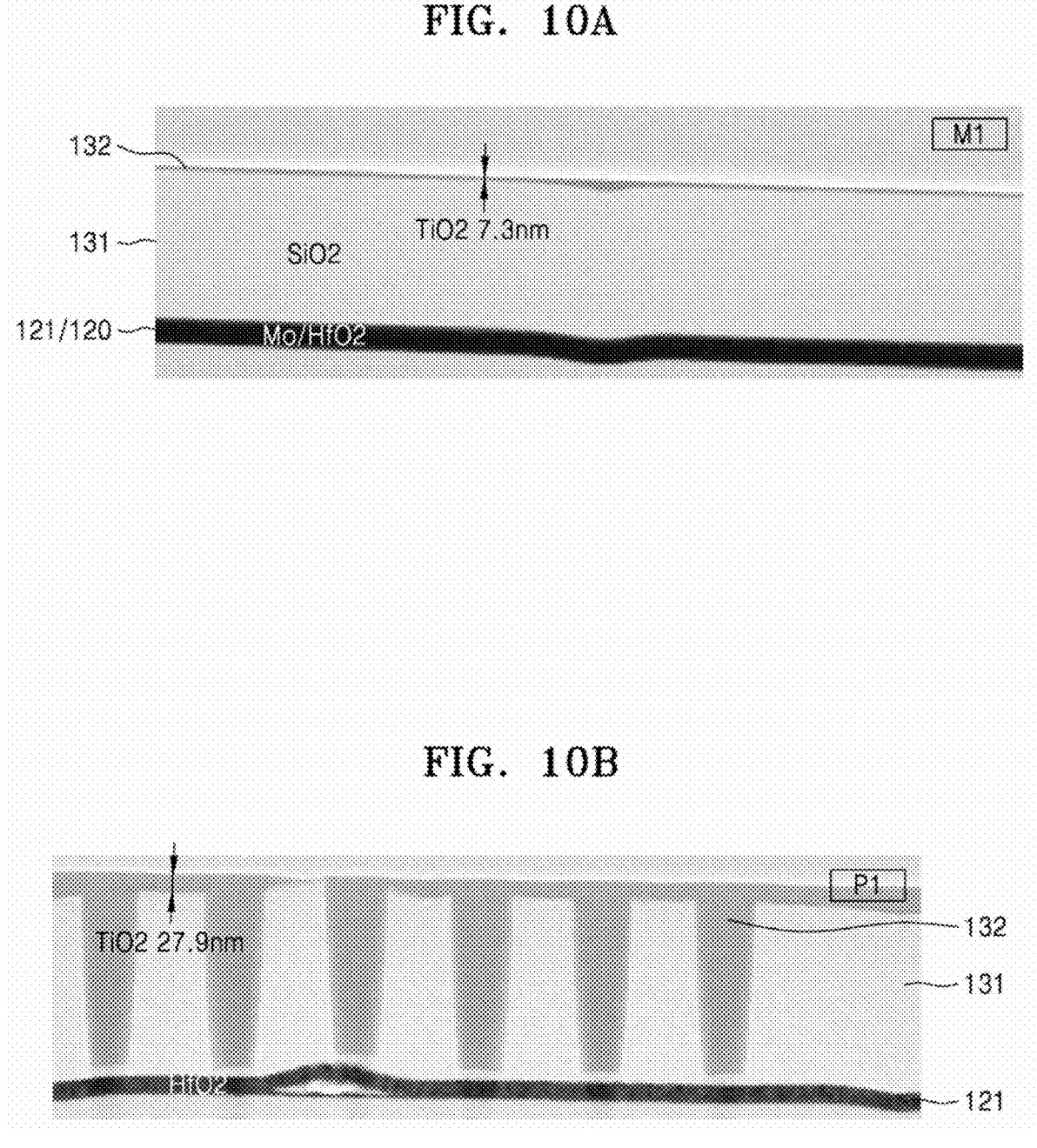
FIG. 10A illustrates transmission electron microscope (TEM) measurement results with respect to a first location where a reflective pad is formed after planarization.
FIG. 10B illustrates TEM measurement results with respect to an active region adjacent to the first location.
Figures 11A, 11B:
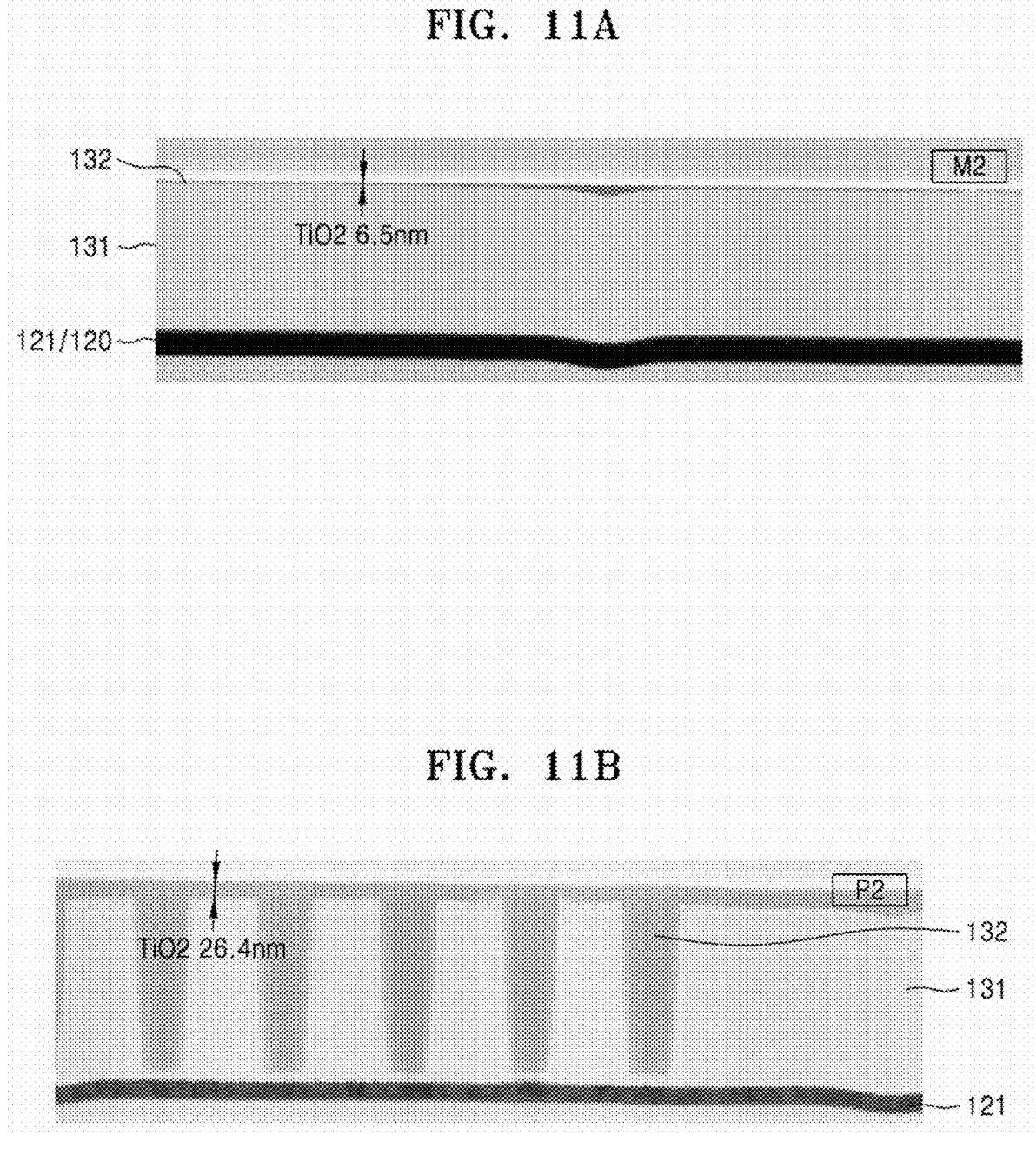
FIG. 11A illustrates TEM measurement results with respect to a second location where a reflective pad is formed after planarization.
FIG. 11B illustrates TEM measurement results with respect to an active region adjacent to the second location.

FIG. 10A illustrates transmission electron microscope (TEM) measurement results after planarization with respect to the first location M1 where the reflective pad 120 is formed, and FIG. 10B illustrates TEM measurement results with respect to the active region P1 adjacent to the first location M1. In addition, FIG. 11A illustrates TEM measurement results after planarization with respect to the second location M2 where the reflective pad 120 is formed, and FIG. 11B illustrates TEM measurement results with respect to the active region P2 adjacent to the second location M2. It was confirmed from the TEM measurement results that the actual thickness of the second dielectric 132 at the first location M1 is about 7.3 nm, and the actual thickness of the second dielectric 132 at the second location M2 is about 6.5 nm. In addition, it was confirmed that the actual thickness of the second dielectric 132 in the active region P1 adjacent to the first location M1 is about 27.9 nm, and the actual thickness of the second dielectric 132 in the active region P2 adjacent to the second location M2 is about 26.4 nm. Accordingly, it may be seen that the thickness (7 nm) of the second dielectric 132 estimated according to an embodiment at the first location M1 where the reflective pad 120 is formed is almost identical to an actually measured value. Meanwhile, it may be seen that there is an error in the thickness (15 nm) of the second dielectric 132 estimated at the third location NP1 where the reflective pad 120 is not formed.

As described with reference to FIGS. 6A to 11B, when the reflective pad 120 is disposed on the lower optical layer 110, most of the illumination light L1 is reflected by the reflective pad 120 and is not incident on the lower optical layer 110. Accordingly, a reflectance spectrum of the reflected light L2 reflected from the reflective pad 120 may be obtained without being substantially affected by the lower optical layer 110. According to the embodiment, an end time of the planarization process may be precisely determined optically by minimizing a measurement error due to a plurality of optical thin films or structures in the lower optical layer 110 during the planarization process of the second dielectric 132, and it is possible to precisely control the thickness of the second dielectric 132. In addition, because the reflective pad 120 is disposed in a non-active region, the performance of a completed optical apparatus or nanostructure layer may not be affected.

Figure 12:
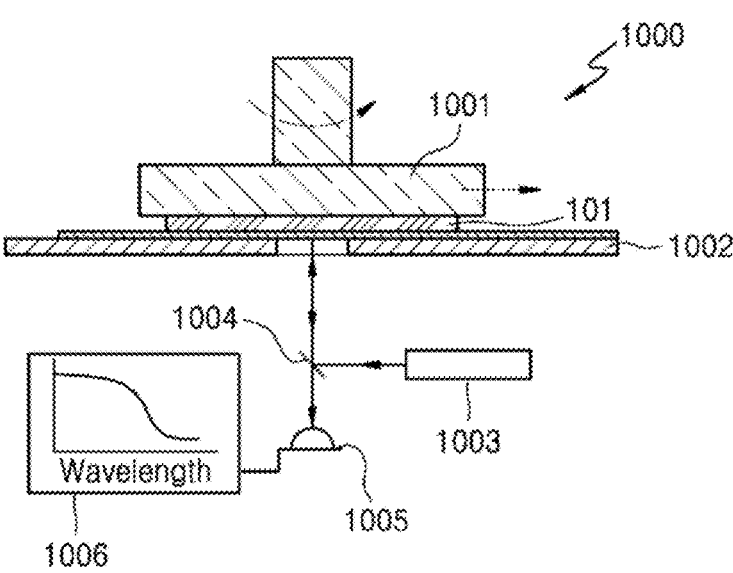
FIG. 12 is a conceptual diagram schematically illustrating a configuration of a planarization apparatus according to an embodiment.

FIG. 12 is a conceptual diagram schematically illustrating a configuration of a planarization apparatus 1000 according to an embodiment. Referring to FIG. 12, the planarization apparatus 1000 according to an embodiment may include a carrier 1001 that supports and rotates a wafer 101 which is a planarization target, a polishing pad 1002 that polishes a planarization target surface of the wafer 101, a light source 1003 that irradiates illumination light on the wafer 101 for planarization monitoring, a photodetector 1005 that detects reflected light reflected from the wafer 101, and a processor 1006 that analyzes spectrum information of the reflected light provided from the photodetector 1005 and calculates a polishing speed and a thickness of a planarization target layer. In addition, the planarization apparatus 1000 may further include a beam splitter 1004 arranged to propagate the illumination light to the wafer 101 and to propagate the reflected light to the photodetector 1005. A plurality of intermediate structures may be formed on an upper surface of the wafer 101 during a manufacturing process of an optical apparatus as shown in FIG. 4D.

The processor 1006 may control operations of the carrier 1001 and the polishing pad 1002 based on information about the polishing speed and the thickness of the planarization target layer. For example, the processor 1006 may control the carrier 1001 and the polishing pad 1002 to achieve a uniform planarization process on the entire region of the wafer 101. Also, the processor 1006 may determine an end time of planarization based on the information about the polishing speed and the thickness of the planarization target layer.

The planarization apparatus 1000 may perform planarization monitoring by irradiating the illumination light to a reflective pad formed on the wafer 101 and analyzing a spectrum of the reflected light reflected from the reflective pad. To this end, the processor 1006 may include a memory that stores information about locations of a plurality of reflective pads disposed in the wafer 101. Based on the information about the location of the reflective pad stored in the memory, the processor 1006 may control locations of the carrier 1001, the polishing pad 1002, the light source 1003 and/or the beam splitter 1004 so that the illumination light may be incident on the reflective pad.

Figure 13:
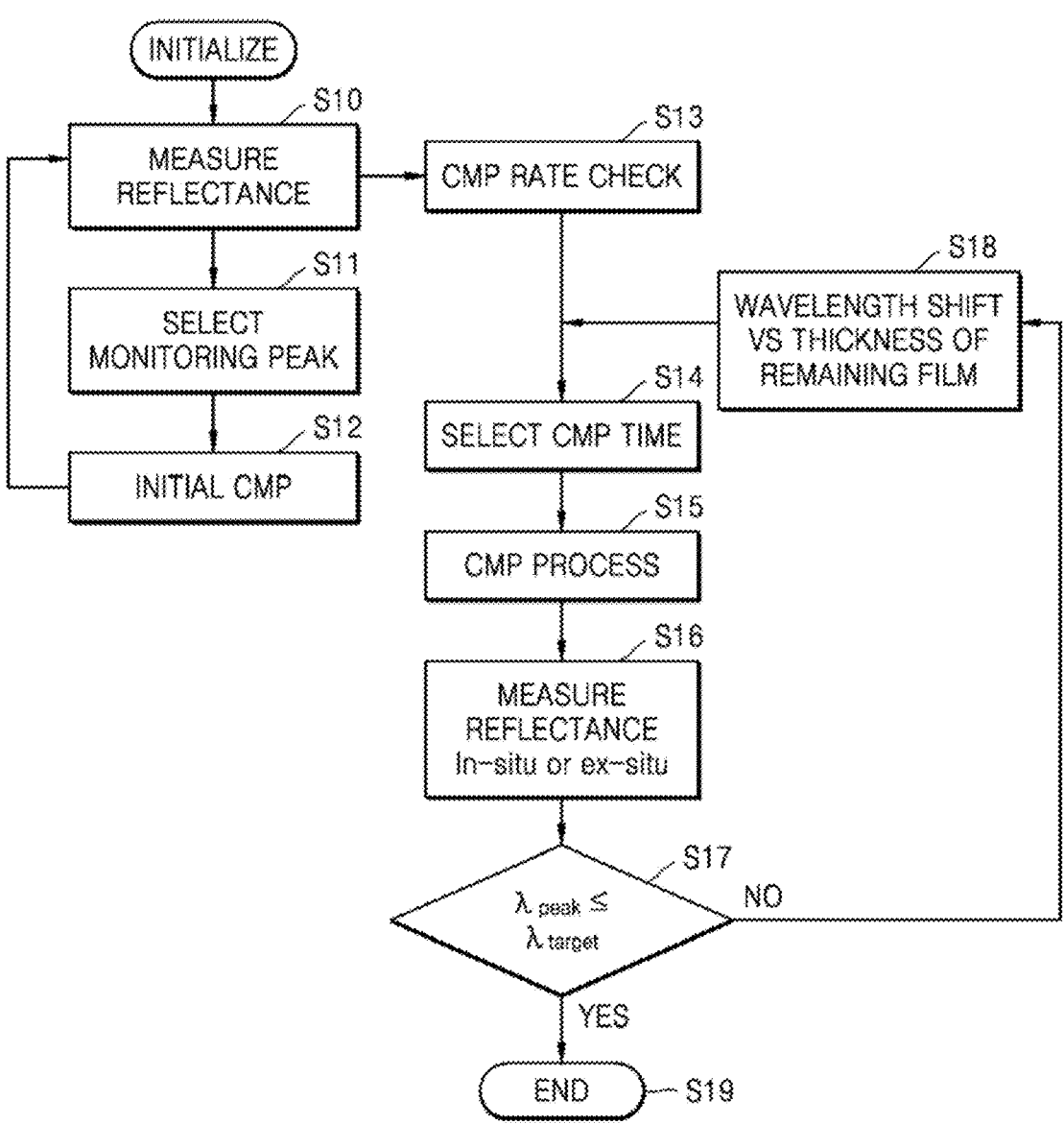
FIG. 13 is a flowchart schematically illustrating a planarization method according to an embodiment.

FIG. 13 is a flowchart schematically illustrating a planarization method according to an embodiment. Referring to FIG. 13, the processor 1006 may analyze a spectrum of reflected light reflected from a reflective pad in the wafer 101. For example, the processor 1006 may measure a reflectance of the reflected light with respect to several wavelengths (S10). Then, the processor 1006 may determine a peak wavelength of reflectance and/or absorbance (S11). The processor 1006 may estimate a current thickness of a planarization target layer based on a peak wavelength of reflectance and/or absorbance obtained by actually measuring the reflected light and a plurality of simulated reflectance spectra obtained by previous simulations with respect to various thicknesses of the planarization target layer. For example, the processor 1006 may estimate the thickness of the planarization target layer by finding a simulated reflectance spectrum having a peak wavelength of the reflectance and/or absorbance identical to or closest to the peak wavelength of the reflectance and/or absorbance obtained by actually measuring the reflected light. To this end, the processor 1006 may previously obtain the plurality of simulated reflectance spectra by simulations with respect to various thicknesses of the planarization target layer and store results thereof in a memory. Alternatively, the processor 1006 may calculate the thickness of the planarization target layer by performing a simulation in real time.

Thereafter, the processor 1006 may operate the carrier 1001 and the polishing pad 1002 to perform an initial planarization process for a predetermined period of time (S12). For example, the processor 1006 may planarize the planarization target layer of the wafer 101 for several seconds to several tens of seconds. The processor 1006 may measure the reflectance of the reflected light again with respect to various wavelengths (S10), and calculate the thickness of the planarization target layer of the wafer 101 polished through an initial planarization process. Through this, the processor 1006 may calculate a polishing speed of the planarization apparatus 1000 (S13). Then, the processor 1006 may predict a remaining amount of time for performing the planarization process based on the information about the current thickness of the planarization target layer, the information about a target thickness of the planarization target layer, and the polishing speed of the planarization apparatus 1000 (S14). The target thickness of the planarization target layer may be a value previously input by a user, and the processor 1006 may store information about the target thickness of the planarization target layer input from the user in the memory of the processor 1006.

Thereafter, the processor 1006 may control the carrier 1001 and the polishing pad 1002 to perform a planarization process on the planarization target layer of the wafer 101 (S15). The processor 1006 may monitor a progress of the planarization process in real time or periodically using an in-situ method or an ex-situ method while performing the planarization process. For example, the processor 1006 may compare the peak wavelength of reflectance and/or absorbance obtained by detecting the reflected light reflected from the reflective pad in the wafer 101 with the peak wavelength of reflectance and/or absorbance obtained by previously simulating the target thickness of the planarization target layer (S16). The processor 1006 may calculate the current thickness of the remaining planarization target layer from a shift degree of the peak wavelength of the actually measured reflectance and/or absorbance (S18), and repeat operations S15 to S18 described above until the thickness of the planarization target layer reaches the target thickness. Finally, when the thickness of the planarization target layer reaches the target thickness, the processor 1006 may end the planarization operation (S19).

As described above, the thickness of the planarization target layer may be precisely controlled by forming the reflective pad in a non-active region among regions where optical apparatuses are to be formed in the wafer 101 and analyzing the spectrum of the reflected light reflected from the reflective pad. In particular, during the process of planarizing the multilayered optical thin film structure of the optical apparatus, measurement errors due to the presence of the plurality of optical thin films may be minimized, and thus an endpoint of a planarization operation may be precisely determined optically. In addition, by comparing the peak wavelength predicted through simulation with the peak wavelength in the actually measured spectrum of the reflected light, the thickness of the planarization target layer, a difference between the thickness and the target thickness, a predicted planarization time, etc. may be precisely estimated. Accordingly, the planarization process may be accurately terminated, and in particular, it is possible to precisely control the thickness of the optical thin film including the meta structure.

Figure 14:
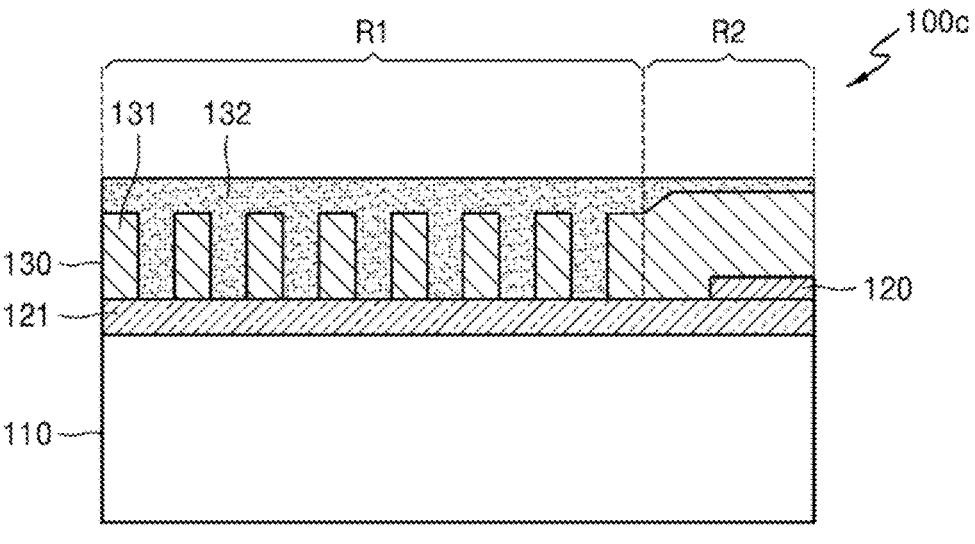
FIG. 14 is cross-sectional view schematically illustrating a structure of an optical apparatus according to an embodiment.

FIG. 14 is a cross-sectional view schematically illustrating a structure of an optical apparatus 100c according to an embodiment. The optical apparatus 100c shown in FIG. 14 is different from the optical apparatus 100b shown in FIG. 3 in that the reflective pad 120 is disposed on the etch stop layer 121. In this case, an upper surface of the etch stop layer 121 may be flat without a step difference. Only the first dielectric 131 and the second dielectric 132 may be present on the reflective pad 120. An upper surface of the first dielectric 131 may have a stepped shape due to the reflective pad 120. The remaining components of the optical apparatus 100c shown in FIG. 14 may be the same as those of the optical apparatus 100b shown in FIG. 3.

Figure 15:
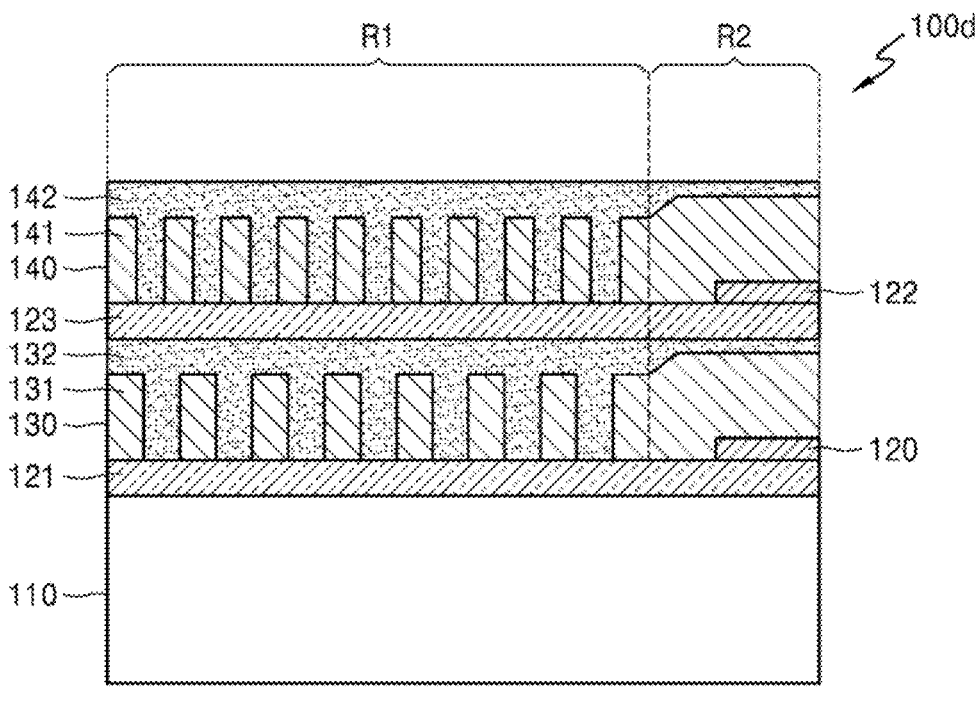
FIG. 15 is a cross-sectional view schematically illustrating a structure of an optical apparatus according to an embodiment.

FIG. 15 is a cross-sectional view schematically illustrating a structure of an optical apparatus 100d according to an embodiment. Referring to FIG. 15, the optical apparatus 100d may have a structure in which two or more nanostructure layers are stacked. For example, the optical apparatus 100d may include a lower optical layer 110, a first etch stop layer 121 disposed to cover the lower optical layer 110, a first reflective pad 120 disposed in the non-active region R2 on the first etch stop layer 121, a first nanostructure layer 130 disposed on the first etch stop layer 121, a second etch stop layer 123 disposed to cover the first nanostructure layer 130, a second reflective pad 122 disposed in the non-active region R2 on the second etch stop layer 123, and a second nanostructure layer 140 disposed on the second etch stop layer 123. The first nanostructure layer 130 and a second nanostructure layer 140 may be disposed to be stacked in a vertical direction, that is, in a thickness direction of the optical apparatus 100d.

The first nanostructure layer 130 may include a patterned first dielectric 131 and a second dielectric 132 filled between patterns of the first dielectric 131. The first dielectric 131 may be patterned only in the active region R1, and the first dielectric 131 in the non-active region R2 may not be patterned. In addition, the second nanostructure layer 140 may include a patterned third dielectric 141 and a fourth dielectric 142 filled between patterns of the third dielectric 141. The third dielectric 141 may be patterned only in the active region R1, and the third dielectric 141 in the non-active region R2 may not be patterned. The third dielectric 141 and the fourth dielectric 142 may include dielectric materials having different refractive indices.

When the optical apparatus 100d shown in FIG. 15 is manufactured, the second dielectric 132 may be planarized in the above-described manner while measuring the reflected light reflected from the first reflective pad 120. After the second dielectric 132 is planarized, the second etch stop layer 123 and the second reflective pad 122 may be formed, and the third dielectric 141 may be deposited and patterned on the second etch stop layer 123. Thereafter, the fourth dielectric 142 may be deposited to fill between the patterns of the third dielectric 141 and cover an upper surface of the third dielectric 141, and the fourth dielectric 142 may be planarized in the above-described manner while measuring the reflected light reflected from the second reflective pad 122. Although the optical apparatus 100d is illustrated as including the two nanostructure layers 130 and 140 in FIG. 15, the disclosure is not limited thereto. For example, three or more nanostructure layers may be stacked.

Figure 16:
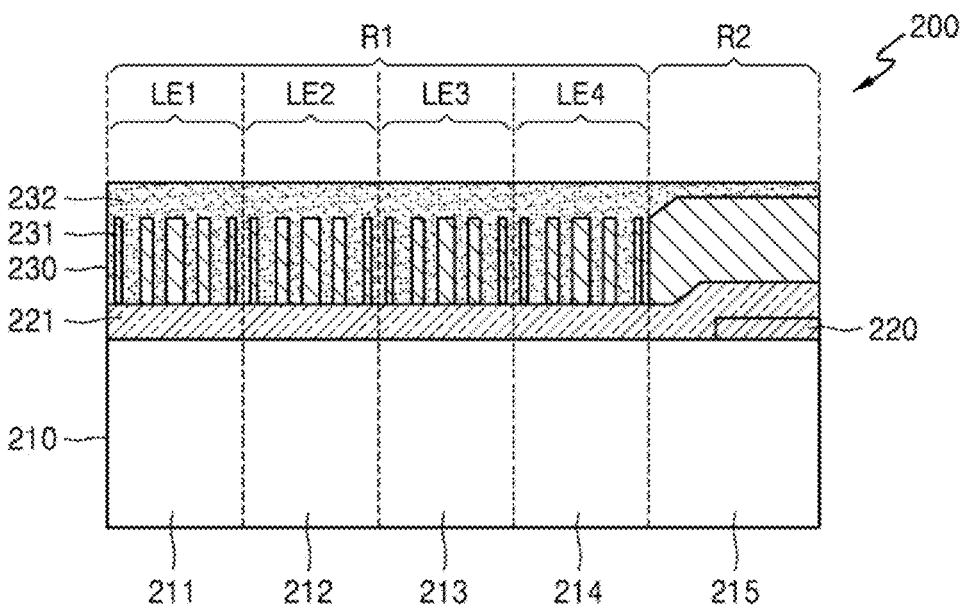
FIG. 16 is a cross-sectional view schematically illustrating a structure of an optical apparatus according to an embodiment.

FIG. 16 is a cross-sectional view schematically illustrating a structure of an optical apparatus 200 according to an embodiment. Referring to FIG. 16, the optical apparatus 200 may include a sensor substrate 210, a reflective pad 220 disposed on the sensor substrate 210, an etch stop layer 221 disposed to cover the sensor substrate 210 and the reflective pad 220, and a meta lens layer 230 disposed on the etch stop layer 221. The optical apparatus 200 may be, for example, an image sensor. The optical apparatus 200 may further include a color filter disposed on the meta lens layer 230.

The sensor substrate 210 may include a plurality of light sensing cells 211, 212, 213, and 214 arranged to face the active region R1 in the active region R1 of the meta lens layer 230 and a driving circuit region 215 disposed to face the non-active region R2 in the non-active region R2 of the meta lens layer 230. The plurality of light sensing cells 211, 212, 213, and 214 may sense incident light and generate an electrical signal according to intensity of the incident light. Each of the plurality of light sensing cells 211, 212, 213, and 214 may include, for example, a photodiode and a thin film transistor switching the photodiode. In the driving circuit region 215, for example, driving circuits such as a timing controller, a row decoder, and an output circuit may be disposed. The sensor substrate 210 may correspond to the lower optical layer 110 of above-described embodiments.

The reflective pad 220 may be disposed in the non-active region R2 on the sensor substrate 210. For example, the reflective pad 220 may be disposed on the driving circuit region 215 of the sensor substrate 210.

The meta lens layer 230 may include a plurality of lens elements LE1, LE2, LE3, and LE4 arranged in the active region R1. The plurality of lens elements LE1, LE2, LE3, and LE4 may correspond to the plurality of light sensing cells 211, 212, 213 and 214, respectively, and may be disposed to face corresponding light sensing cells among the plurality of light sensing cells 211, 212, 213, and 214 in a vertical direction. The plurality of lens elements LE1, LE2, LE3, and LE4 may be configured to respectively focus the incident light on the corresponding plurality of light sensing cells 211, 212, 213, and 214. To this end, the meta lens layer 230 may include a patterned first dielectric 231 and a second dielectric 232 filled between patterns of the first dielectric 231 and covering an upper surface of the first dielectric 231. The first dielectric 231 and the second dielectric 232 may include dielectric materials having different refractive indices. In each of the plurality of lens elements LE1, LE2, LE3, and LE4, the first dielectric 231 may be patterned to form a planar optical meta lens. The second dielectric 232 may be planarized to have a planar upper surface. The meta lens layer 230 may correspond to the nanostructure layer 130 of the above-described embodiments.

Figure 17:
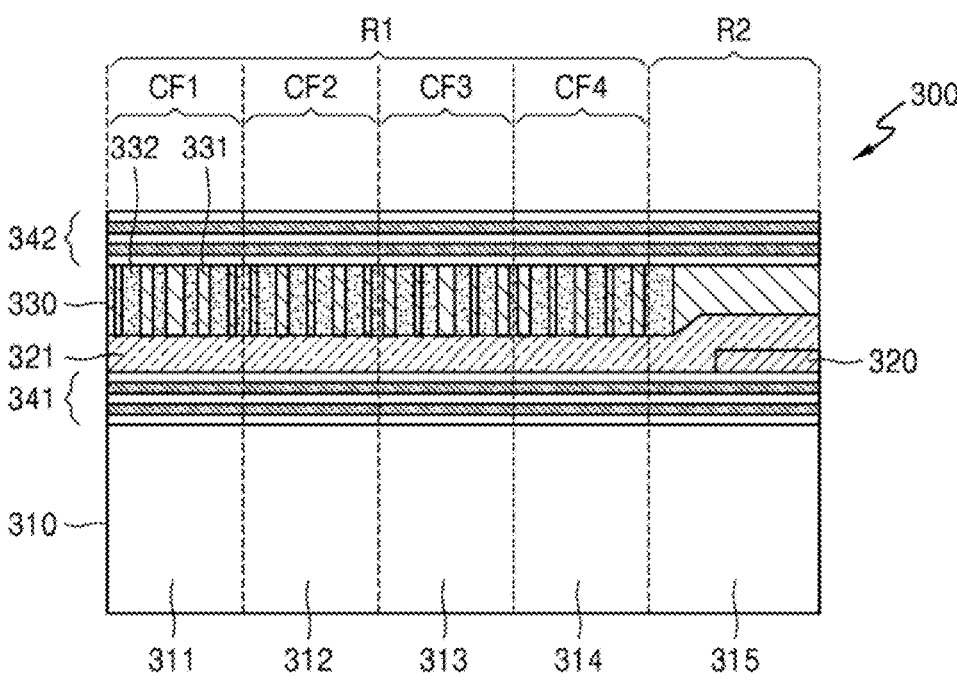
FIG. 17 is a cross-sectional view schematically illustrating a structure of an optical apparatus according to an embodiment.

FIG. 17 is a cross-sectional view schematically illustrating a structure of an optical apparatus 300 according to an embodiment. Referring to FIG. 17, the optical apparatus 300 may include a sensor substrate 310, a first reflector 341 disposed on the sensor substrate 310, a reflective pad 320 disposed in the non-active region R2 on the first reflector 341, an etch stop layer 321 disposed to cover both the first reflector 341 and the reflective pad 320, a meta color filter layer 330 disposed on the etch stop layer 321, and a second reflector 342 disposed on the meta color filter layer 330. The optical apparatus 300 may be, for example, an image sensor.

The sensor substrate 310 may correspond to the lower optical layer 110 of the above-described embodiments, and the meta color filter layer 330 may correspond to the nanostructure layer 130 of the above-described embodiments. The first reflector 341 may be disposed between the sensor substrate 310 corresponding to the lower optical layer 110 and the meta color filter layer 330 corresponding to the nanostructure layer 130.

The sensor substrate 310 may include a plurality of light sensing cells 311, 312, 313, and 314 arranged in the active region R1 and a driving circuit region 315 arranged in the non-active region R2. The light sensing cells 311, 312, 313, and 314 and the driving circuit region 315 may have the same configurations as those of the light sensing cells 211, 212, 213, 214 and the driving circuit region 215 described with reference to FIG. 16.

The first reflector 341 and the second reflector 342 may be, for example, a distributed Bragg reflector (DBR) formed by alternately stacking two dielectric layers having different refractive indices. The first reflector 341 and the second reflector 342 disposed to face each other may form a resonator that resonates light. Light incident through an upper surface of the second reflector 342 may resonate between the first reflector 341 and the second reflector 342, and then may be incident on the sensor substrate 310 by exiting through a lower surface of the first reflector 341. The meta color filter layer 330 is disposed between the first reflector 341 and the second reflector 342. The light repeatedly passes through the meta color filter layer 330 while resonating between the first reflector 341 and the second reflector 342. Accordingly, the characteristic of light emitted through the lower surface of the first reflector 341 may be mainly determined by a structure of the meta color filter layer 330.

The meta color filter layer 330 may include a plurality of color filters CF1, CF2, CF3, and CF4 arranged in the active region R1. The plurality of color filters CF1, CF2, CF3, and CF4 may correspond to the plurality of light sensing cells 311, 312, 313 and 314, respectively, and may be disposed to face the corresponding light sensing cells among the plurality of light sensing cells 311, 312, 313 and 314 in a vertical direction. The plurality of color filters CF1, CF2, CF3, and CF4 may operate together with the first reflector 341 and the second reflector 342 to have different transmittances with respect to light having different wavelengths. To this end, the meta color filter layer 330 may include a plurality of first dielectrics 331 and a plurality of second dielectrics 332 alternately arranged in a horizontal direction, that is, in a direction parallel to an upper surface of the first reflector 341 or a lower surface of the second reflector 342. The first dielectric 331 and the second dielectric 332 may include dielectric materials having different refractive indices. In the plurality of color filters CF1, CF2, CF3, and CF4, an arrangement period or pitch of the plurality of first dielectrics 331 and the plurality of second dielectrics 332, a width of each of the first dielectrics 331 and the second dielectrics 332, etc. may be different from each other. Only one of the first dielectric 331 and the second dielectric 332 may be disposed in the non-active region R2.

Figure 18:
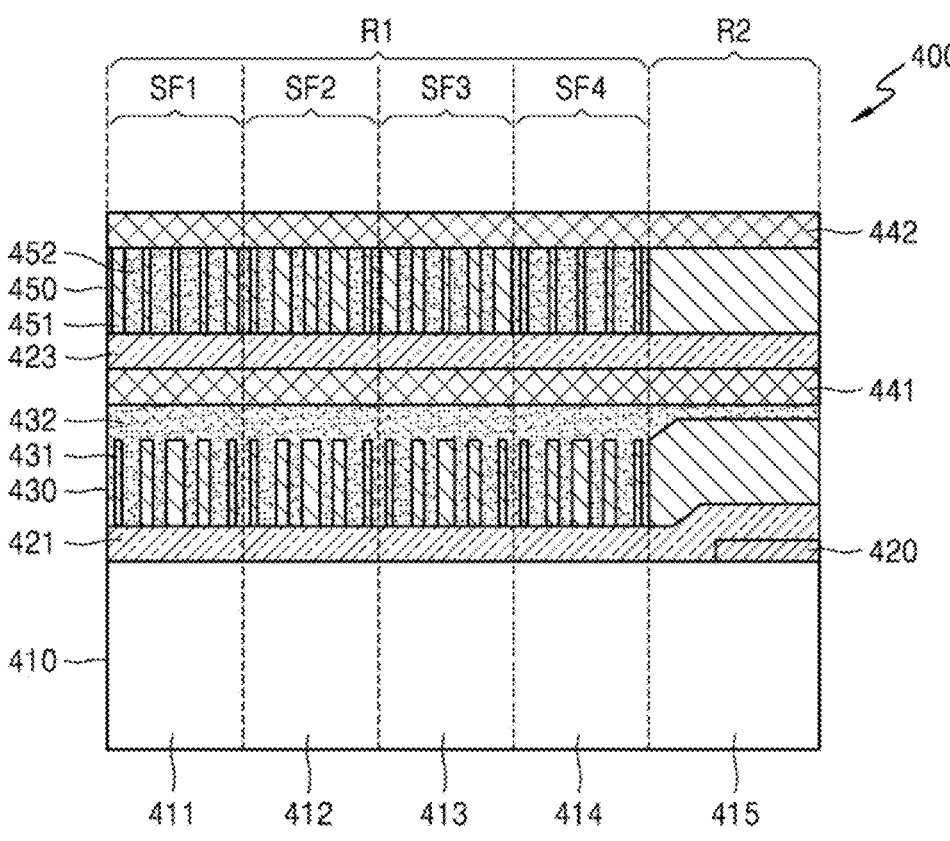
FIG. 18 is a cross-sectional view schematically illustrating a structure of an optical apparatus according to an embodiment.

FIG. 18 is a cross-sectional view schematically illustrating a structure of an optical apparatus 400 according to an embodiment. Referring to FIG. 18, the optical apparatus 400 may include a sensor substrate 410, a reflective pad 420 disposed in the non-active region R2 on the sensor substrate 410, a first etch stop layer 421 disposed to cover the sensor substrate 410 and the reflective pad 420, a first nanostructure layer 430 disposed on the first etch stop layer 421, a first metal reflective layer 441 disposed on the first nanostructure layer 430, a second etch stop layer 423 disposed on the first metal reflective layer 441, a second nanostructure layer 450 disposed on the second etch stop layer 423, and a second metal reflective layer 442 disposed on the second nanostructure layer 450. The optical apparatus 400 may be, for example, a spectroscopic sensor. The sensor substrate 410 may correspond to the lower optical layer 110 of the above-described embodiments. The first metal reflective layer 441 may be disposed between the first nanostructure layer 430 and the second nanostructure layer 450. The second nanostructure layer 450 may be disposed between the first metal reflective layer 441 and the second metal reflective layer 442 which are disposed to face each other. The second etch stop layer 423 may be disposed between the first metal reflective layer 441 and the second nanostructure layer 450.

The sensor substrate 410 may include a plurality of light sensing cells 411, 412, 413, and 414 arranged in the active region R1 and a driving circuit region 415 arranged in the non-active region R2. The light sensing cells 411, 412, 413, and 414 and the driving circuit region 415 may have the same configurations as those of the light sensing cells 211, 212, 213, and 214 and the driving circuit region 215 described with reference to FIG. 16, respectively.

The first nanostructure layer 430, the first metal reflective layer 441, the second nanostructure layer 450, and the second metal reflective layer 442 may together form a spectral filter layer. The spectral filter layer may include a plurality of spectral filters SF1, SF2, SF3, and SF4 arranged in the active region R1. The plurality of spectral filters SF1, SF2, SF3, and SF4 may correspond to the plurality of light sensing cells 411, 412, 413 and 414, respectively, and may be disposed to face the corresponding light sensing cells among the plurality of light sensing cells 411, 412, 413 and 414, in a vertical direction.

The first nanostructure layer 430 may include first dielectrics 431 patterned differently with respect to the plurality of spectral filters SF1, SF2, SF3, and SF4, and second dielectrics 432 filled between patterns of the first dielectric 431 and covering an upper surface of the first dielectrics 431. The first dielectric 431 and the second dielectric 432 may include different dielectric materials. In addition, the first dielectric 431 is patterned only in the active region R1 and is not patterned in the non-active region R2.

The first metal reflective layer 441 and the second metal reflective layer 442 may each include a reflective metal material. For example, the first and second metal reflective layers 441 and 442 may include at least one of gold (Au), silver (Ag), aluminum (Al), copper (Cu), tungsten (W), molybdenum (Mo), or platinum (Pt) or an alloy thereof.

The second nanostructure layer 450 disposed between first metal reflective layer 441 and the second metal reflective layer 442 may form a resonator together with the first and second metal reflective layers 441 and 442. The second nanostructure layer 450 may be formed so that resonators have different resonant wavelengths in the plurality of spectral filters SF1, SF2, SF3, and SF4. To this end, the second nanostructure layer 450 may include a plurality of third dielectric 451 and a plurality of fourth dielectrics 452 alternately arranged in a horizontal direction, that is, in a direction parallel to the upper surface of the first metal reflective layer 441 or the lower surface of the second metal reflective layer 442. The third dielectric 451 and the fourth dielectric 452 may include dielectric materials having different refractive indices. In the plurality of spectral filters SF1, SF2, SF3, and SF4, an arrangement period or pitch of the plurality of third dielectrics 451 and the plurality of fourth dielectrics 452, a width of each of the third dielectrics 451 and the fourth dielectrics 452, etc. may be different from each other. Only one of the third dielectric 451 and the fourth dielectric 452 may be disposed in the non-active region R2.

When manufacturing the optical apparatus 400 illustrated in FIG. 18, the second dielectric 432 may be planarized in the above-described manner while measuring reflected light reflected from the reflective pad 420. After the second dielectric 432 is planarized, the first metal reflective layer 441 and the second etch stop layer 423 may be formed, and the third dielectric 451 may be deposited and patterned on the second etch stop layer 423. Thereafter, the fourth dielectric 452 may be deposited to be filled between patterns of the third dielectric 451 and to cover the upper surface of the third dielectric 451. In addition, the third dielectric 451 and the fourth dielectric 452 may be planarized so that the third dielectric 451 and the fourth dielectric 452 have a common flat upper surface. In this regard, because the first metal reflective layer 441 is already formed, the first metal reflective layer 441 may be used as a reflective pad without an additional reflective pad. For example, the third dielectric 451 and the fourth dielectric 452 may be planarized in the above-described manner while measuring the reflected light reflected from the first metal reflective layer 441.

Although the optical apparatus including the multilayered optical thin film structure and the method and apparatus for planarizing the multilayered optical thin film structure described above are described with reference to the drawings, it should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An optical apparatus comprising:
   a lower optical layer;
   a nanostructure layer disposed on the lower optical layer, the nanostructure layer comprising an active region and a non-active region; and
   a reflective pad disposed between the lower optical layer and the nanostructure layer to face the non-active region of the nanostructure layer,
   wherein the nanostructure layer comprises a first dielectric patterned in the active region and unpatterned in the non-active region and a second dielectric filled between patterns of the first dielectric, and
   wherein the first dielectric comprises a first material and the second dielectric comprises a second material different from the first material and having a different refractive index from a refractive index of the first material,
   wherein an edge of the reflective pad proximate to the active region is disposed away from a boundary between the active region and the non-active region to form an offset away from the boundary,
   wherein a size of the reflective pad is smaller than a size of the non-active region, and
   wherein a height of an uppermost surface of the first dielectric in the non-active region is higher than a height of an uppermost surface of the first dielectric in the active region, wherein in the non-active region, the first dielectric has an inclined surface in an area disposed above the offset from a first upper surface which is proximate to the active region to the uppermost surface which disposed further from the active region.

2. The optical apparatus of claim 1, wherein the second dielectric is disposed to cover the upper surface of the first dielectric, and an upper surface of the second dielectric has a planar surface.

3. The optical apparatus of claim 2, wherein a thickness of the second dielectric on the upper surface of the first dielectric in the active region is greater by a thickness of the reflective pad than a thickness of the second dielectric on the upper surface of the first dielectric in the non-active region.

4. The optical apparatus of claim 1, wherein a thickness of the reflective pad is about 10 nm to about 50 nm.

5. The optical apparatus of claim 1, wherein the reflective pad is circular or polygonal having an area of about 5 $\mu m^2$ to about 25 $\mu m^2$.

6. The optical apparatus of claim 1,
wherein the second dielectric is disposed only between adjacent patterns of a plurality of patterns of the first dielectric in the active region,
wherein the first dielectric and the second dielectric comprise a planar common upper surface, and
wherein a thickness of the first dielectric in the active region is greater than a thickness of the first dielectric on the reflective pad.

7. The optical apparatus of claim 1, further comprising an etch stop layer disposed between the lower optical layer and the nanostructure layer, the etch stop layer being disposed to cover the reflective pad.

8. The optical apparatus of claim 7, wherein a height of an upper surface of the etch stop layer in the non-active region is greater than a height of an upper surface of the etch stop layer in the active region by a thickness of the reflective pad.

9. The optical apparatus of claim 1, further comprising an etch stop layer disposed between the lower optical layer and the nanostructure layer, wherein the reflective pad is disposed on the etch stop layer.

10. The optical apparatus of claim 1, wherein a width or a diameter of each pattern of a plurality of patterns of the first dielectric is about 10 nm to about 400 nm, and a thickness of each pattern of the plurality of patterns of the first dielectric is about 100 nm to about 1,500 nm.

11. The optical apparatus of claim 1,
wherein the lower optical layer comprises a sensor substrate comprising a plurality of light sensing cells arranged to face the active region and a driving circuit region arranged to face the non-active region,
wherein the nanostructure layer comprises a meta lens layer comprising a plurality of lens elements disposed to face the plurality of light sensing cells in the active region, and
wherein the first dielectric in each of the plurality of lens elements is patterned to form a planar optical meta lens.

12. The optical apparatus of claim 1,
wherein the lower optical layer comprises a sensor substrate comprising a plurality of light sensing cells arranged to face the active region and a driving circuit region arranged to face the non-active region,
wherein the nanostructure layer comprises a meta color filter layer comprising a plurality of color filters disposed to face the plurality of light sensing cells in the active region, and wherein a plurality of the first dielectrics and a plurality of the second dielectrics are alternately arranged in a horizontal direction in the plurality of color filters.

13. The optical apparatus of claim 12, further comprising a first reflector disposed between the lower optical layer and the nanostructure layer and a second reflector disposed on the nanostructure layer,
wherein the reflective pad is disposed in the non-active region on the first reflector.

14. The optical apparatus of claim 1, wherein the nanostructure layer comprises a first nanostructure layer and a second nanostructure layer stacked in a thickness direction of the optical apparatus.

15. The optical apparatus of claim 14, further comprising a first metal reflective layer disposed between the first nanostructure layer and the second nanostructure layer, and a second metal reflective layer disposed on the second nanostructure layer.

16. The optical apparatus of claim 15,
wherein the lower optical layer comprises a sensor substrate comprising a plurality of light sensing cells arranged to face the active region and a driving circuit region arranged to face the non-active region, and
wherein the first nanostructure layer, the first metal reflective layer, the second nanostructure layer, and the second metal reflective layer are configured to form a spectral filter layer comprising a plurality of spectral filters arranged in the active region.

17. A method of manufacturing an optical apparatus, the method comprising:
forming a lower optical layer;
forming a reflective pad in an edge region of an upper surface of the lower optical layer;
forming an etch stop layer to a constant thickness to cover both the lower optical layer and the reflective pad;
forming a first dielectric on the etch stop layer to a constant thickness;
patterning a portion of the first dielectric disposed within an active region of the optical apparatus;
forming a second dielectric to be filled in a space between patterns of the patterned first dielectric and to cover the first dielectric; and
planarizing an upper surface of the second dielectric;
wherein the planarizing comprises:
irradiating illumination light to the reflective pad and detecting reflected light from the reflective pad; and
determining a polishing speed, a thickness of the second dielectric, and an end time of the planarizing by comparing a simulated reflectance spectrum of reflected light according to the thickness of the second dielectric obtained previously through simulation with an actually measured reflectance spectrum obtained by the detecting of the reflected light,
wherein a thickness of the second dielectric on an upper surface of the first dielectric in the active region is greater by a thickness of the reflective pad than a thickness of the second dielectric on the upper surface of the first dielectric in a non-active region of the optical apparatus,
wherein an edge of the reflective pad proximate to the active region is disposed away from a boundary between the active region and the non-active region to form an offset away from the boundary, and
wherein a size of the reflective pad is smaller than a size of the non-active region.

18. The method of claim 17, wherein the reflective pad is disposed to face a non-active region of the optical apparatus where the first dielectric is not patterned.

\* \* \* \* \*